United States Patent
Roselli et al.

(10) Patent No.: US 6,718,486 B1
(45) Date of Patent: Apr. 6, 2004

(54) FAULT MONITOR FOR RESTARTING FAILED INSTANCES OF THE FAULT MONITOR

(75) Inventors: Drew Shaffer Roselli, Berkeley, CA (US); Rico Blaser, Berkeley, CA (US); Mikel Carl Lechner, Campbell, CA (US)

(73) Assignee: David E. Lovejoy, Tiburon, CA (US)

( * ) Notice: Subject to any disclaimer, the term of this patent is extended or adjusted under 35 U.S.C. 154(b) by 770 days.

(21) Appl. No.: 09/624,747

(22) Filed: Jul. 24, 2000

Related U.S. Application Data

(63) Continuation-in-part of application No. 09/360,899, filed on Jan. 26, 2000, now abandoned.

(51) Int. Cl.[7] .............................................. G06F 11/00
(52) U.S. Cl. .......................................... 714/41; 714/47
(58) Field of Search ................................ 714/4, 13, 31, 714/39, 41, 47, 55

(56) References Cited

U.S. PATENT DOCUMENTS

| | | | | |
|---|---|---|---|---|
| 5,638,510 A | * | 6/1997 | Ishikawa | 714/51 |
| 5,740,357 A | * | 4/1998 | Gardiner et al. | 714/57 |
| 5,748,882 A | * | 5/1998 | Huang | 714/47 |
| 5,805,785 A | * | 9/1998 | Dias et al. | 714/4 |
| 6,266,781 B1 | * | 7/2001 | Chung et al. | 714/4 |
| 6,460,149 B1 | * | 10/2002 | Rowlands et al. | 714/43 |
| 6,477,663 B1 | * | 11/2002 | Laranjeira et al. | 714/11 |

* cited by examiner

Primary Examiner—Robert Beausoliel
Assistant Examiner—Gabriel L. Chu
(74) Attorney, Agent, or Firm—David E. Lovejoy

(57) ABSTRACT

A computer system having a fault-tolerance framework in an extendable computer architecture. The computer system is formed of clusters of nodes where each node includes computer hardware and operating system software for executing jobs that implement the services provided by the computer system. Jobs are distributed across the nodes under control of a hierarchical resource management unit. The resource management unit includes hierarchical monitors that monitor and control the allocation of resources. In the resource management unit, a first monitor, at a first level, monitors and allocates elements below the first level. A second monitor, at a second level, monitors and allocates elements at the first level. The framework is extendable from the hierarchy of the first and second levels to higher levels where monitors at higher levels each monitor lower level elements in a hierarchical tree. If a failure occurs down the hierarchy, a higher level monitor restarts an element at a lower level. If a failure occurs up the hierarchy, a lower level monitor restarts an element at a higher level. Each of the monitors includes termination code that causes an element to terminate if duplicate elements have been restarted for the same job. The termination code in one embodiment includes suicide code whereby an element will self-destruct when the element detects that it is an unnecessary duplicate element.

72 Claims, 11 Drawing Sheets

FAULT MONITOR FOR RESTARTING FAILED INSTANCES OF THE FAULT MONITOR

CROSS-REFERENCE

This application is a continuation-in-part of the application entitled MARKET ENGINES HAVING EXTENDABLE COMPONENT ARCHITECTURE, invented by Rico (NMI) Blaser; SC/Ser. No. 09/360,899; Filing Date: Jan. 26, 2000, now abandoned.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND OF THE INVENTION

The present invention relates to the field of electronic commerce (e-commerce) and particularly to electronic systems in capital markets and other e-commerce applications with high availability and scalability requirements.

Historically, mission critical applications have been written for and deployed on large mainframes, typically with built-in (hardware) or low-level operating system (software) fault-tolerance. In some prior art, such fault-tolerance mechanisms include schemes where multiple central processing units (CPUs) redundantly compute each operation and the results are used using a vote (in the case of three-way or more redundancy) or other logical comparisons of the redundant outcomes in order to detect and avoid failures. In some cases a fault-stop behavior is implemented where it is preferred to stop and not execute a program operation when an error or other undesired condition will result. This fault-stop operation helps to minimize the propagation of errors to other parts of the system. In other implementations, elaborate fault recovery mechanisms are implemented. These mechanisms typically only recover hardware failures since application failures tend to be specific to the particular application software. To detect errors in application software, vast amounts of error-handling code have been required. Certain financial applications have devoted as much as 90% to error detection and correction. Because of the enormous complexity of such software applications, it is nearly impossible to entirely eliminate failures that prevent the attainment of reliable and continuous operation.

Increasingly, systems need to be available on a continuous basis, 24 hours per day, 7 days per week (24/7 operation). In such nonstop environments it is undesirable for a system to be unavailable when system components are being replaced or software and hardware failures are detected. In addition, today's applications must scale to increasing user demands that in many cases exceed the processing capabilities of a single computer, regardless of size from small to mainframe. When the system load cannot be handled on a single machine, it has been difficult and costly to obtain a larger machine and move the application to the larger machine without downtime. Attempts to distribute work over two or more self-contained machines is often difficult because the software typically has not been written to support distributed computations.

For these reasons, the need for computational clusters has increased. In computational clusters, multiple self-contained nodes are used to collaboratively run applications. Such applications are specifically written to run on clusters from the outset and once written for clusters, applications can run on any configuration of clustered machines from low-end machines to high-end machines and any combination thereof. When demand increases, the demand is easily satisfied by adding more nodes. The newly added nodes can utilize the latest generation of hardware and operating systems without requiring the elimination or upgrading of older nodes. In other words, clusters tend to scale up seamlessly while riding the technology curve represented in new hardware and operating systems. Availability of the overall system is enhanced when cluster applications are written so as not to depend on any single resource in the cluster. As resources are added to or removed from a cluster, applications are dynamically rescheduled to redistribute the workload. Even in the case where a significant portion of the cluster is down for service, the application can continue to run on the remaining portion of the cluster. This continued operation has significant advantages particularly when employed to implement a cluster-based component architecture of the type described in the above-identified cross-referenced application entitled MARKET ENGINES HAVING EXTENDABLE COMPONENT ARCHITECTURE.

While clustering technology shows promise at overcoming problems of existing systems, there exists a need for practical clustering systems. In practical clustering systems, it is undesirable for each application in a cluster system to manage its own resources. First, it is inefficient to have each application solve the same resource management problems. Second, scheduling for conflict resolution and load-balancing (which is important for scalability) is more effectively solved by a common flexible (extensible) resource manager that solves the common problem once, instead of solving the problem specifically for each application. Furthermore, failure states tend to be complex when each application behaves differently as a result of failures and with such differences, it is almost impossible to model the impact of such failures from application to application running on the cluster. To overcome these problems, commercial and academic projects have arisen with the objective of providing a clustering architecture that provides isolation between physical systems and the applications they execute.

To date, however, proposed clustering architectures are complex and can only handle a limited number of specific system failures. In addition, proposed clustering software does not appropriately scale up across multiple sites. There is a need, therefore, for a simple and elegant clustering architecture that includes fault-tolerance and load-balancing, that is extendable over many computer systems and that has a flexible interface for applications. In such an architecture, the number of failure states needs to be kept low so that extensive testing is possible to render the system more predictability. Hardware as well as software failures need to be detected and resources need to be rescheduled automatically, both locally as well as remotely. Rescheduling needs to occur when a particular application or resource is in high demand. However, rescheduling should be avoided when unnecessary because rescheduling can degrade application performance. When possible, rescheduling should only occur in response to resource shortages or to avoid near-term anticipated shortages. If the system determines that resource requirements are likely to soon exceed the capacity of a system element, then the software might appropriately reschedule to avoid a sudden near-term crunch. The result of this "anticipatory" rescheduling is avoidance of resource bottlenecks and thereby improvement in overall application performance. The addition and removal of components and resources needs to occur seamlessly in the system.

In view of the above background, it's an object of the present invention to provide an improved fault-tolerance framework for an extendable computer architecture.

SUMMARY

The present invention is computer system having a fault-tolerance framework in an extendable computer architecture. The computer system is formed of clusters of nodes where each node includes computer hardware and operating system software for executing jobs that implement the services provided by the computer system. Jobs are distributed across the nodes under control of a hierarchical resource management unit. The resource management unit includes hierarchical monitors that monitor and control the allocation of resources.

In the resource management unit, a first monitor, at a first level, monitors and allocates elements below the first level. A second monitor, at a second level, monitors and allocates elements at the first level. The framework is extendable from the hierarchy of the first and second levels to higher levels where monitors at higher levels each monitor lower-level elements in a hierarchical tree. If a failure occurs down the hierarchy, a higher level monitor restarts an element at a lower level. If a failure occurs up the hierarchy, a lower-level monitor restarts an element at a higher level. While it may be adequate to have two levels of monitors to keep the framework self-sufficient and self-repairing, more levels may be efficient without adding significant complexity. It is possible to have multiple levels of this hierarchy implemented in a single process.

In some embodiments, each of the monitors includes termination code that causes an element to terminate if duplicate elements have been restarted for the same operation. The termination code in one embodiment includes suicide code whereby an element will self-destruct when the element detects that it is an unnecessary duplicate element.

In one local level embodiment, the resource management unit includes agents as elements in the first level where the agents monitor and control the allocation of jobs to nodes and includes a local coordinator in the second level where the local coordinator monitors and controls the allocation of jobs to agents. Also, the agents monitor the local coordinator. Failure of a job results in the monitoring agent for the failed job restarting a job to replace the failed job. Failure of an agent results in the monitoring agent for the failed agent restarting of an agent to replace the failed agent. Failure of the local coordinator results in restarting of a local coordinator to replace the failed local coordinator. In a particular example of a local level embodiment, the agents are implemented as host agents where a host agent only monitors the jobs running on one node.

In a higher level hierarchy, one or more group coordinators are added at a group level above the local level where each group coordinator monitors and controls multiple local coordinators where each local coordinator monitors and controls lower level agents which in turn monitor and control lower level jobs.

In a still higher level hierarchy, one or more universal coordinators are added at a universal level above the group level where each universal coordinator monitors and controls multiple local coordinators where each local coordinator monitors and controls lower level agents which in turn monitor and control lower level jobs.

The present computer system gives highest priority to maintaining the non-stop operation of important elements in the processing hierarchy which, in the present specification, is defined as operations that are jobs. While other resources such as the computer hardware, computer operating system software or communications links are important for any instantiation of a job that provide services, the failure of any particular computer hardware, operating system software, communications link or other element in the system is not important since upon such failure, the job is seamlessly restarted using another instantiation of the failing element. The quality of service of the computer system is represented by the ability to keep jobs running independently of what resource fails in the computer system by simply transferring a job that fails, appears to have failed or appears that failure is imminent and such transfer is made regardless of the cause and without necessarily diagnosing the cause of failure.

The present computer system utilizes redundancy of simple operations to overcome failures of elements in the system. The redundancy is facilitated using hierarchical monitors that decouple fault-tolerance processes for monitoring failure from the services (executed by application programs that are implemented by jobs).

An indication of progress of a service is determined by using, in applications that provide a service, the capability of processing progress messages. The progress messages traverse the vital paths of execution of the service before returning a result to the progress monitor. The progress monitor is independent of the fault-tolerance layer and does not interfere with fault-tolerant operation. Restart of failing jobs is simple and quick without need to analyze the cause of failure or measure progress of the service.

The present computer system inherently provides a way to seamlessly migrate operation to new or different hardware and software. Because the present computer system inherently assigns jobs among available resources and automatically transfers jobs when failures occur, the same dynamic transfer capability is used seamlessly, maintaining non-stop operation, for system upgrade, system maintenance or other operation where new or different hardware and software are to be employed.

The present computer system operates such that if any element is in a state that is unknown (such as a partial, possible or imminent failure) then the fault-tolerant operation reacts by assuming a complete failure has occurred and thereby immediately forces the system into a known state. The computer system does not try to analyze the failure or correct the failure for purposes of recovery, but immediately returns to a known good state and recalculates anything that may have happened since the last known good state.

The present computer system works well in follow-the-sun operations. For example, the site of actual processing is moved from one location (for example, Europe) to another location (for example, US) where the primary site is Europe during primary European hours and the primary site is US during primary US hours. Such follow-the-sun tends to achieve better performance and lower latency. The decision of when to switch over from one site to another can be controlled by a customer or can be automated.

The present system includes an interface that collects and provides output information and receives input information and commands that allow humans to monitor and control the computer system and each of the components and parts thereof. The interface logs data and processes the logged data to form statistics including up-time, down-time, failure, performance, configuration, versions, through-put and other component and system information. The interface provides data for system availability measurements, transaction tracking and other information that may be useful for satisfying obligations in service agreements with customers.

The present system provides, when desired, customer process isolation. For example, first jobs running on first nodes associated with a first customer are isolated from second jobs associated with a second customer running on second nodes, where the second nodes are different from the first nodes.

The foregoing and other objects, features and advantages of the invention will be apparent from the following detailed description in conjunction with the drawings.

DETAILED DESCRIPTION

Figure 1:
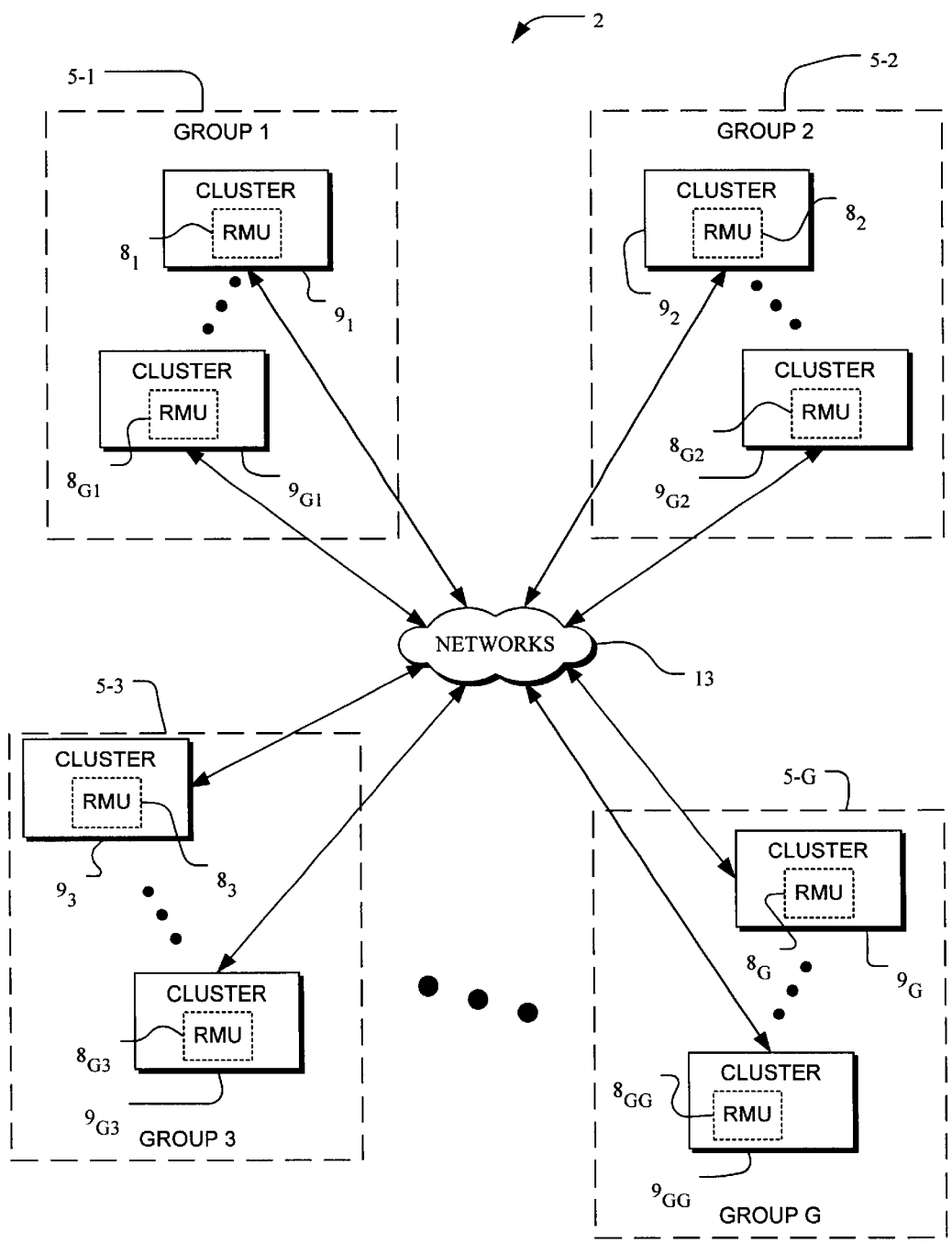
FIG. 1 depicts computer system consisting of distributed groups of clusters.

Cluster Groups—FIG. 1

In FIG. 1, a plurality of clusters 9 are distributed in different groups 5 including groups 5-1, 5-2, 5-3, . . . , 5-G and connect through the networks 13 to form an e-commerce system 2. The groups 5 are organized on geographical, company, type of information processed or other logical basis.

In one example, the groups 5 of clusters 9 in FIG. 1 are distributed geographically around the world. The group 5-1, for example, has clusters 9, and specifically clusters $9_1, \ldots, 9_{G1}$, located in Europe. Group 5-2, by way of example, includes clusters 9, and specifically clusters $9_2, \ldots, 9_{G2}$, located in Asia. Group 5-3, for example, includes clusters 9, and specifically clusters $9_3, \ldots, 9_{G3}$, located in the eastern United States and group 5-G, by way of example, includes clusters 9, and specifically clusters $9_G, \ldots, 9_{GG}$, located in the western United States.

In a geographic distribution example, the FIG. 1 worldwide e-commerce system 2 is controlled in different ways. In one example, each group 5 is in a different region of the world where each region controls worldwide transactions during the principal business hours of that region and where the control shifts to another region when the principal business hours shift thereby implementing a "follow-the-sun" operation. Since the principal business hours change as a function of time and location around the world, transactions that are principal at one point in time in one group 5 are shifted to another group 5 in another region at different times of day relative to common time.

In one embodiment of a follow-the-sun operation, a single site for a group 5 is at one location in the world and that single site serves customers around the world where primary access privileges for that site are passed in a follow-the-sun manner to different persons around the world. In that one embodiment, the primary access privileges participate in a follow-the-sun operation but the actual processing site does not change location in the world. In another embodiment of a follow-the-sun operation, multiple sites for multiple groups 5 at multiple locations in the world are enabled to serve customers around the world where the primary site for actual processing is re-designated from location to location so as to follow-the-sun. By moving the site of actual processing from one location (for example, Europe) to another location (for example, US) where the primary site is Europe during primary European hours and the primary site is US during primary US hours tends to achieve better performance and lower latency. The decision of when to switch over from one site to another can be controlled by the client or can be automated.

In order to control the operations of the groups 5 of clusters 9, each group 5 includes one or more resource management units (RMUs) 8 for controlling the group operation. In one example, a resource management unit 8 is present in each cluster, whereby transactions are routed to different clusters in the same or different groups as a function of time or other parameters. Each resource management unit (RMU) 8 is associated with other processes including communication and function processes for supporting cluster operation and communication.

In another example, the groups 5 of clusters 9 in FIG. 1 are organized based upon operations of a single company or a group of companies. For example, group 5-1 includes all of the clusters 9 for a single company that service one geographic region (for example, Berlin) while group 5-2 includes all of the clusters 9 for the same company that service another geographic region (for example, New York City). In such an example, resource management units (RMUs) 8 control the group operations.

In still another example where the groups 5 of clusters 9 in FIG. 1 are organized based upon operations of a single company, the group 5-1 includes all of the clusters 9 in that company that service a particular type of information (for example, one type of marketable instruments such as stocks)

while group 5-2 includes all of the clusters 9 in that company that service another type of information (for example, another type of marketable instruments such as bonds or derivatives). In such an example, resource management units (RMUs) 8 control the group operations.

The above examples illustrate that any combination of clusters 9 can be used to establish the common control functions within one or more groups 5 and within the e-commerce system 2.

Figure 2:
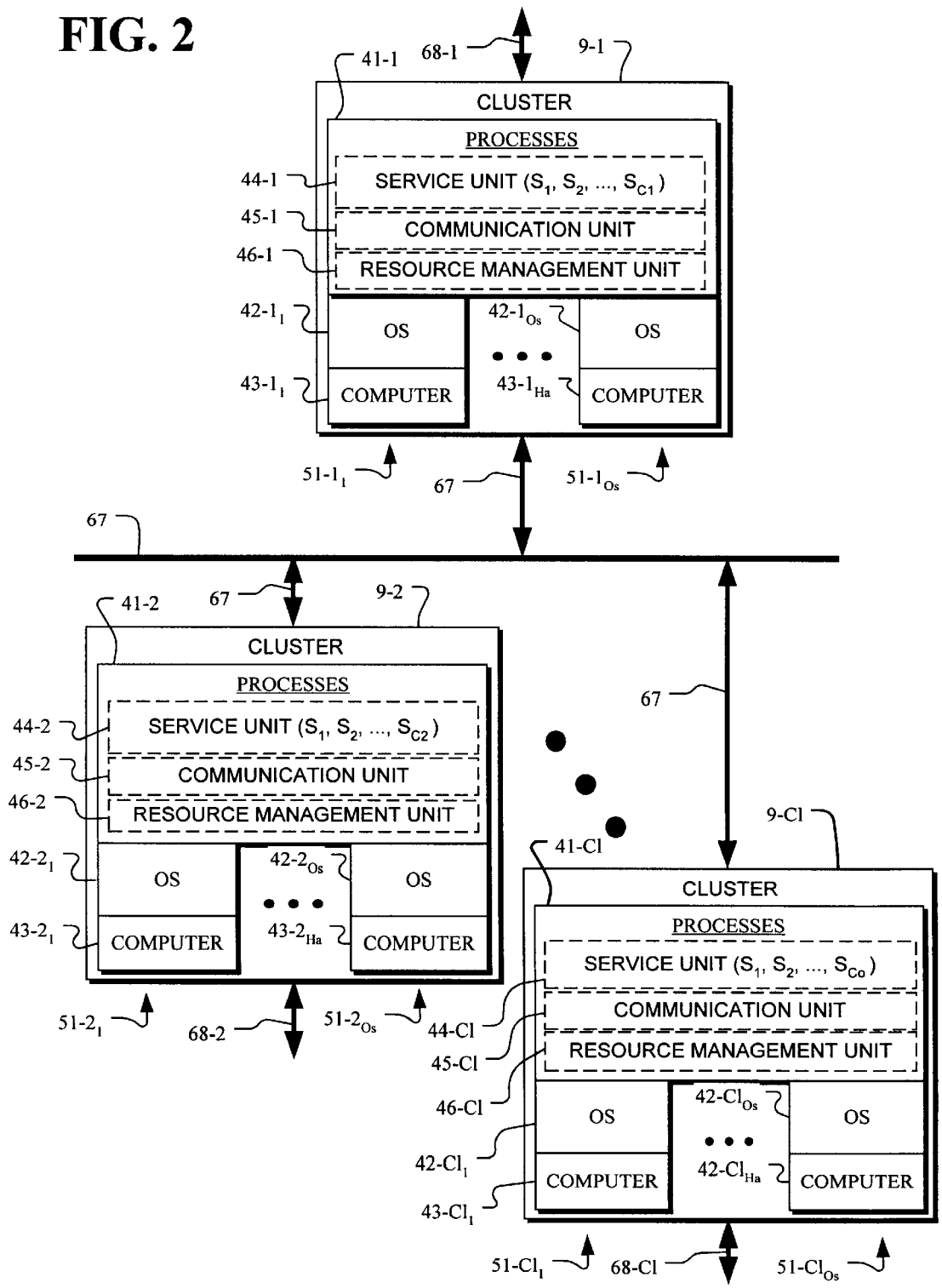
FIG. 2 depicts details of the clusters of the type employed in FIG. 1.

Multiple Cluster Design.—FIG. 2

In FIG. 2, typical ones of the clusters 9 of FIG. 1 are shown including clusters 9-1, 9-2, . . . , 9-Cl. The cluster 9-1 is typical of clusters 9 and includes one or more nodes 51 shown as nodes $51\text{-}1_1$, . . . , $51\text{-}1_{Os}$ that are formed of one or more computers $43\text{-}1_1$, . . . , $43\text{-}1_{Ha}$, each computer having corresponding operating systems (OSs) 42-1 including operating systems $42\text{-}1_1$, . . . , $42\text{-}1_{Os}$, respectively. Processes 41-1 are distributed to execute on the nodes formed of operating systems 42-1 and computers 43-1 of cluster 9-1. The processes 41-1 of cluster 9-1 are organized as belonging to a service unit 44-1, a communications unit 45-1 and a resource management unit 46-1.

In FIG. 2, the service unit 44-1 includes the services $S_1$, $S_2$, $S_{Cl}$ and these services are the primary reason that cluster 9-1 exists. By way of example, if the primary purpose of cluster 9-1 is to execute financial transactions in an e-commerce system, like the e-commerce system described in connection with FIG. 14, then the different services $S_1$, $S_2$, . . . , $S_{Cl}$ of the service unit 44-1 correspond to some or all of the components 71-2, . . . , 71-Co of FIG. 14. Each of the services of service unit 44-1 is partitioned into one or more jobs 30 for execution on a node 51.

In FIG. 2, the communication unit 45-1 controls communications from and to the cluster 9-1 and the other clusters 9-2, . . . , 9-Cl of FIG. 2. The communication unit 45-1 controls the intra-cluster communication with other communication units 45-2, . . . , 45-Cl of FIG. 2 over the connection elements 67 and controls the extra-cluster communication external to the clusters 9 of FIG. 2 over the connection elements 68.

In FIG. 2, resource management unit 46-1 includes, for example, processes that are units for fault tolerance, load balancing and persistent storage operations.

While cluster 9-1 is typical of the clusters 9 of FIG. 1, each of the other clusters 9-2, . . . , 9-Cl includes one or more nodes 51 shown as nodes $51\text{-}2_1$, . . . , $51\text{-}2_{Os}$, and so on to nodes $51\text{-}\text{Cl}_1$, . . . , $51\text{-}\text{Cl}_{Os}$ that are formed of one or more computers 43 that are shown as $3\text{-}2_1$, . . . , $43\text{-}2_{Ha}$, and so on to $43\text{-}\text{Cl}_1$, . . . , $43\text{-}\text{Cl}_{Ha}$, each computer having corresponding operating systems (OSs) 42 including operating systems $42\text{-}2_1$, . . . , $42\text{-}2_{Os}$ and so on to $42\text{-}\text{Cl}_1$, . . . , $42\text{-}\text{Cl}_{Os}$, respectively. Processes 41-2 and so on to 41-Cl have jobs that are distributed to execute on the nodes formed of operating systems 42-2 and computers 43-2 and so on to operating systems 42-Cl and computers 43-Cl of cluster 9-2, . . . , 9-Cl, respectively. The processes 41-2 and so on to 41-Cl of clusters 9-2 and so on to 9-Cl are organized as belonging to service units 44-2 and so on to 44-Cl, communications units 45-2 and so on to 45-Cl and resource management units 46-2 and so on to 46-Cl.

The communication processes of the communication unit 45 of FIG. 2 are ones that are suitable for the particular embodiment selected for the connection elements 67 and 68. The connection elements 67 and 68 are logical entities that rely on the necessary physical interconnection of each of the clusters 9 and appropriate protocols for those interconnections. When the connection element 67 or 68 is implemented as a local area network using TCP/IP, for example, the processes of communication units 45 provide for IP address assignment and addressing as a means to control communication among the clusters 9. When the connection element is implemented using point-to-point switching, for example, the communication processes are those suitable for providing point-to-point switching protocols for transferring data between clusters 9. Regardless of the implementation of elements 67 and 68, the processes of communication units 45 provide a logically consistent interface among clusters 9 that permits both homogeneous clusters (using the same hardware computers and operating systems) as well as heterogeneous clusters (using different hardware computers and/or operating systems) to transfer data. Nodes, in addition to being of different hardware and operating systems, may also run heterogeneous applications. The reasons for heterogeneous applications include, for example, environments where special hardware that is needed to run an application is only available on certain nodes or special software that is needed to run an application is only available on certain nodes (for example, software licenses).

In one particular embodiment, the communication unit 45 uses object serialization to transmit messages (or other) objects from one of the communication units 45 to another one of the communication units 45. This operation is done by initiating a network connection (for example a TCP/IP connection), then serializing the message object into a datastream which is usually buffered. The data stream is then transmitted by the transmitting communication unit 45 over the connection element 67 operating with the TCP/IP protocol to the receiving communication unit 45 where it is de-serialized. In an example using the FIG. 14 system, one embodiment sends meta-data of a buy/sell order from the TI interface component 71-10 to the storage component 71-13 and subsequently to the crossing component 71-3. The Java Remote Method Invocation (RMI) interface by Sun Microsystems can be used to implement such object serialization communication methods.

For different message-types and embodiments of the connection element 67, the use of other communication protocols with different flow-control mechanisms, delivery guarantees and directory services are used. Various schemes over IP provide alternate embodiments. For example, heartbeat messages use the UDP/IP protocol because reliable delivery is not required. Communication protocols are not restricted to IP-based schemes, the only requirement is that both the transmitting cluster as well as the receiving cluster are capable of handling messages in a selected protocol. Other messaging systems, such as Remote Procedure Call (RPC) and Active Messages, are acceptable implementations as well.

In other embodiments, higher-level (fast) messaging systems are used to communicate between clusters. Examples include TIBCO or NEON messaging layers which are again able to completely abstract the communication layer from the underlying hardware clusters and thus effectively act as middle-ware. Other middleware products include Talarian Smart Sockets, Java Message Queue and Vitria.

In further embodiments, multiple clusters run on the same hardware and operating system node using the same memory. In such embodiments, the same communication mechanisms are used as described above. Additionally, specialized inter-process communication schemes can be used for improved performance and better use of system resources.

In general, operations that are performed by the FIG. 2 system include jobs that execute to provide the services 44, include processes used in connection with the communication units 45 and the resource management units 46 and include operating system calls for operating systems 42, memory controls and availability determinations, network access control and latency determinations and any other operations useful in or in connection with the computer system of FIG. 2.

Figure 3:
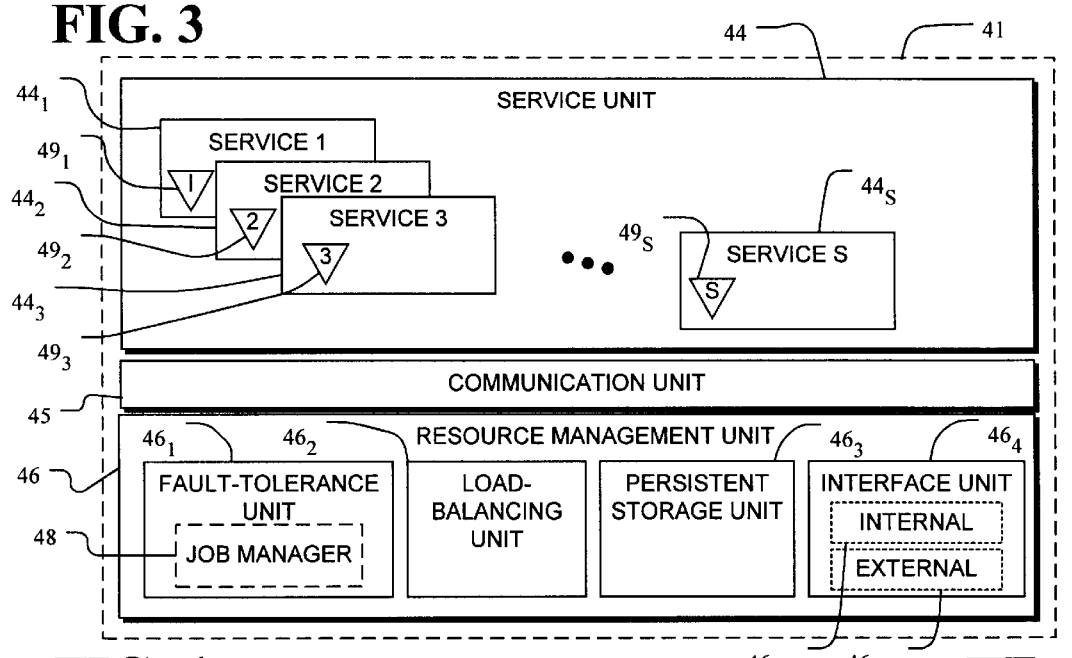
FIG. 3 depicts further details of the processes running on the clusters of FIG. 2.

Process Architecture—FIG. 3

FIG. 3 depicts a logical overview of the architecture of a set of processes 41 typical of the distributed sets of processes 41-1, 41-2, . . . , 41-Cl in the clusters 9 of FIG. 2. A typical set of process 41 in FIG. 3 includes the service unit 44 processes that are typical of the distributed service units 44-1, 44-2, . . . , 44-Cl in the clusters 9 of FIG. 2. The service unit 44 processes include the services $44_1, 44_2, 44_3, \ldots, 44_S$ that are applications or functions that as a whole are typically distributed across multiple nodes of a cluster (that is, for cluster 9-1 of FIG. 2, across one or more computers $43\text{-}1_1, \ldots, 43\text{-}1_{Ha}$, and corresponding operating systems $42\text{-}1_1, \ldots, 42\text{-}1_{Os}$, respectively) or across nodes of multiple clusters.

The set of processes 41 in FIG. 3 include the communication unit 45 processes that are typical of the distributed communication units 45-1, 45-2, . . . , 45-Cl in the clusters 9 of FIG. 2. The set of processes 41 in FIG. 3 include the resource management unit 46 processes that are typical of the distributed resource management units 46-1, 46-2, . . . , 46-Cl in the clusters 9 of FIG. 2. The resource management unit 46 includes a fault tolerance unit 46, for ensuring fault tolerant operation of the processes 41 and the clusters 9 on which they execute. The fault tolerance unit 46, includes a job manager 48 for scheduling resources among the services $44_1, 44_2, 44_3, \ldots, 44_S$. The resources scheduled include, for example, CPU time, disk and memory privileges and network bandwidth. While such resource management is a function that in conventional systems is usually performed by the operating system 42 on each. node of a cluster 9 of FIG. 2, the distributed resource management unit 46 is provided to add fault tolerance, load-balancing, persistent storage and output capabilities to each cluster 9 and to the global e-commerce system 2.

For fault tolerance operation, if a hardware or software component fails on a node, the distributed resource management unit 46 through operation of the fault-tolerance unit 46, automatically restarts the component on the same or a different node. If possible, restarting on the same node is desirable since in this way the failure is fixed at a lower level without having to make a call to a higher level. If not possible to restart on the same node, the operation restarts the interrupted component on a different node. If a cluster failure occurs, or if non-failing other nodes on a cluster are not suitable for restarting the component, all services are then restarted to run on a different cluster. If a group of clusters fail, all services are scheduled to run on a different group of clusters. A group of clusters has redundancy and ordinarily is not expected to fail. However, group failure may occur in some disasters (such as an earthquake or other environmental calamity) but such occurrence is expected to be rare. In other situations, it may also be desirable to move services to another group of clusters without interrupting service. For example, planned maintenance, upgrades, load balancing and reconfiguration all may involve moving services among clusters and groups of clusters.

For load balancing operation, the distributed resource management unit 46 through operation of the fault-tolerance unit $46_2$ detects when a particular resource in a cluster or group of clusters is being taxed or is likely to be taxed more than other comparable resources and takes appropriate action to reschedule some of the jobs to a less taxed resource, thereby achieving load-balancing.

The distributed resource management unit 46 uses a persistent storage unit $46_3$ in order to allow applications such as the services $44_1, 44_2, 44_3, \ldots, 44_S$ to store state information about executing processes to nonvolatile memory of persistent storage unit $46_3$ in a consistent way. Such state information typically includes computational results and data to checkpoint the executing application at restartable execution points. Checkpoints are selected to store operating parameters and progress of an application after major computational steps or at certain points in the execution sequence. If a failure occurs, applications that operate with such checkpoints are restarted by the fault-tolerance unit $46_1$ and/or the load-balancing unit $46_2$ at the last successfully completed checkpoint. Because the persistent storage facility $46_3$ is part of the resource management unit 46, state information can be transparently replicated to remote sites, allowing immediate fail-over even in the case of a site failure.

The interface unit $46_4$ is part of the resource management unit 46. The interface unit $46_4$ collects and provides output information and receives input information and commands that allow humans to monitor and control the computer system 2 (see FIG. 1) and each of the components and parts thereof. The interface unit $46_4$ logs data and processes the logged data to form statistics about the overall system and about each component in the system including up-time, down-time, failure, performance, configuration, versions, through-put and other component and system information. The interface unit $46_4$ provides data for system availability measurements, transaction tracking and other information that may be desirable or required. Such output data is useful for, among other things, satisfying obligations in service agreements with customers that require contracted levels of system availability and transaction tracking for satisfying legal or other obligations. The interface unit $46_4$ has an internal unit $46_{4\text{-}1}$, that provides full data and control to system administrators and others having authority to access the system for such full access. The interface unit $46_4$ also has an external unit $46_{4\text{-}2}$ that provides one or more levels of access to customers or others not having authority for full system access. Typically, the external unit is used by or for customers to monitor the overall availability of a service being delivered to the customers.

There is a tradeoff between the interval of checkpointing and the amount of recomputation needed upon failure. In some embodiments (based upon the current state of storage technology), a greater amount of recomputing is preferable over more frequent checkpointing. Each application that uses the framework may decide what is most effective for given hardware and software constraints and the application requirements. The decision of how often to checkpoint is to some degree application-specific. More frequent checkpoints slow down application performance and less frequent checkpoints require more computation to recover from failure. The best checkpoint frequency for each application is determined and used for operation. Another factor that affects checkpoint frequency is the publication of results. A checkpoint is also required each time results are published outside of the cluster (for example, to a customer). The checkpoint is require because recomputation does not necessarily produce identical results. Therefore, once results are published, recomputation is no longer an acceptable recovery strategy.

Persistent storage can be distributed in many ways, for example, some embodiments distribute storage over an entire cluster using RAID technology and other embodiments dedicate persistent storage to separate machines.

The fault-tolerance framework described operates to keep processes running continuously by providing a hierarchy of monitors that are capable of restarting any failing process or migrating processes to different nodes on the network when a hardware or software failure is discovered. The hierarchy also makes sure that the individual monitors are running correctly.

For applications that use processes that do not require state information (stateless processes), the fault-tolerance framework works well, is fast and does not require persistent storage because it is not important where the application is running or what data it was being processed before a failure. An example of an application that uses stateless processes is a web server that serves static HTML pages to clients regardless of which pages the client requested previously or of which pages other clients have requested in the mean time. In this example, the fault-tolerance framework need only operate to make sure that an adequate number of web servers are running to ensure continuous availability of the service. In this example, the same client can be served by one server for one request and by another server for another request without any apparent change in the service as viewable by the client.

For applications that use processes that do require state information (stateful processes), the fault-tolerance framework works to preserve sufficient state information to enable restarting and transfer of processes. An example of an application using stateful processes is a financial instrument crossing application in which, for example, stock shares of a buy order and a sell order are matched and crossed (that is, are bought and sold). In such a trading application, a trader submits an order to trade shares to an electronic market and, regardless of failure, the order must not be lost and must remain active in the system until it is executed, expires or is cancelled. Restrictions on the orders and crossing need to be considered and properly processed even in the case of failures in the system during the processing. Also, normal trading rules need to be followed. For example, the rule must be followed that each share can only be executed once against orders of the same kind on each side (buy with sell; sell with buy).

In order to prevent failures from causing a stateful process from being lost altogether or improperly executed, a messaging layer with in the communication unit 45 routes and reroutes processing to avoid the consequences of failures as they occur. When the fault-tolerance framework transfers or restarts processes on different nodes, other processes need to be able to reach the rerouted or transferred processes after they have been migrated to new nodes. For example, if orders of a certain type are initially matched on one node but are subsequently migrated for matching to new node, a cancellation message for one of these orders needs to be routed to the new node automatically. Similarly, a new order for matching must be directed to the new node after migration. In operation, the messaging layer processes messages with logical destinations that use a logical-to-physical translation that makes any physical transfer transparent to the affected processes.

When possible, the fault-tolerance framework only restarts processes once it ensures that the processes have actually failed. At times, however, there is a trade-off between how quickly a process can be restarted and how accurately it has been determined that the process has actually failed. In some cases which are intended to be rarely occurring, a process is started or restarted that did not fail so that one or more unintended instance of a process is executing at the same time as the intended instance. In a stateless system, restarting of a non-failed process or the otherwise starting of unintended duplicate processes is only a minor problem because the result is only that one additional process is activated in a non-conflicting way to handle requests. However, in a stateful system, a process that is started as a replacement for a process that did not fail needs to be handled correctly and to ensure that the unintended duplicate processes do not cause data or process corruption.

In order to control the operation of processes in an environment where unintended duplicate processes may occur, a persistent storage facility is used to store state data that is needed by the system to continue processing in an environment where unintended duplicate processes have or may occur because of system failures or because of other reasons. The stored state data is used, for example, with checkpoints in executing applications and processes to ensure coordination between execution states of the executing processes and the stored state data in the persistent store. The coordination between the executing process and their known states, the stored states in the persistent store and the control algorithms for controlling reliable processing in spite of failures and duplicates achieves highly reliable operation and availability.

In order to ensure that indispensable processes can communicate, a messaging layer is used that interfaces with a directory service that is integrated with the fault-tolerance framework. The directory service operates to conveniently locate information in the framework thereby ensuring that a seamless operation results even in the presence of failures.

The architecture of the processes 41 of FIG. 3 can advantageously utilize embodiments of the communication element 67 of FIG. 2 that interconnects the different nodes and services in one or more of the clusters 9. Typically, element 67 includes a different interconnect for communication local to one node from that of inter-node communications. In addition, inter-cluster communications and wide-area communications also likely use different communication mechanisms. The selection of components for the connection elements 67 is done consistently with the architecture of the processes 41 of FIG. 3.

Figure 4:
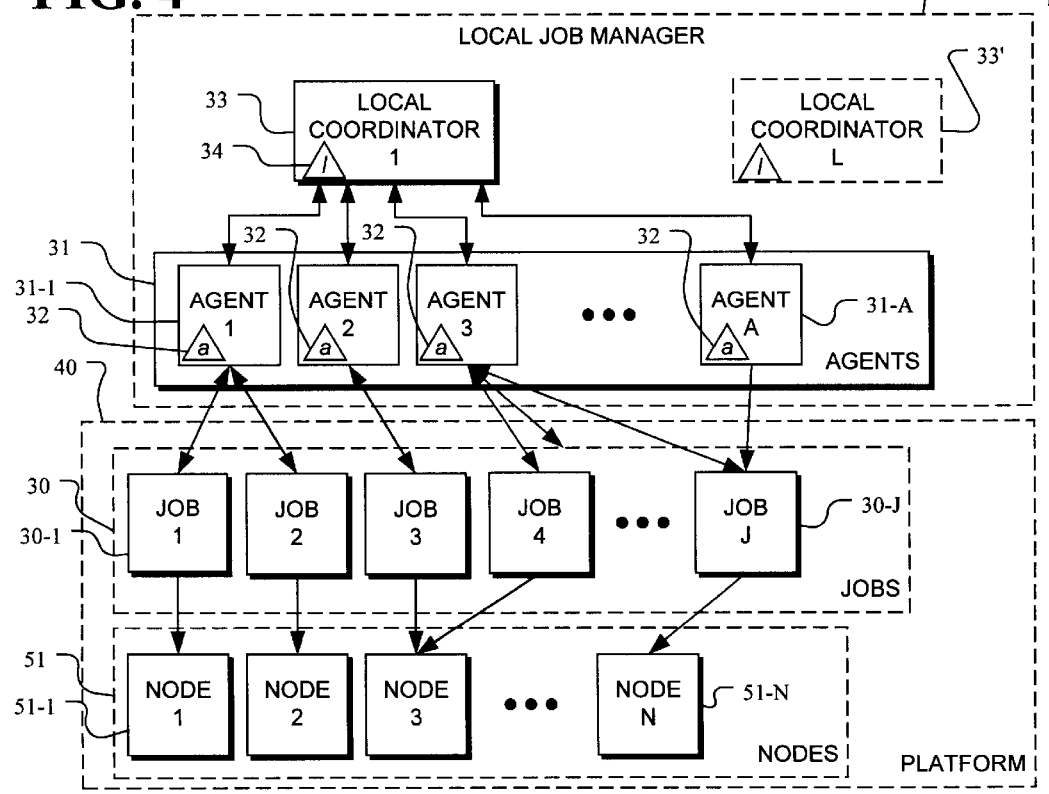
FIG. 4 depicts a logical view of the local job manager hierarchy running at levels in the hierarchy above jobs running on nodes of a platform.

Local Job Manager—FIG. 4

FIG. 4 depicts a logical view of the hierarchy of a local job manager $48_1$, which is one embodiment of the job manager 48 of FIG. 3, together with the local platform 40 including the jobs 30 and nodes 51 on which the jobs execute. The nodes 51, including nodes 51-1, . . . , 51-N, in local platform 40 are any set of all or some of the nodes 51 for the clusters 9 of FIG. 2. These nodes 51 in FIG. 4 are implemented using suitable computational devices, such as workstations or mainframes, with single-processor or multi-processor configurations. The nodes 51 are the resources that are assigned for executing the jobs 30 that perform the services 44 of FIG. 3.

In FIG. 4, the jobs 30, including jobs 30-1, . . . , 30-J are, for example, programs, threads, executable code or data structure tasks that are useful in providing data processing services 44. For fault-tolerant operation, the jobs 30 are monitored for proper operation, execution and termination. Each job 30 runs on one node 51 and multiple jobs 30 can run on the same node 51 so that there can be a many-to-one mapping of jobs to nodes. In FIG. 4, for example, Job 3 and Job 4 both run on Node 3 in a two-to-one mapping.

In FIG. 4, the agents 31, including agents 31-1, . . . , 31-A, are monitors that monitor the execution of the jobs 30. One agent 31 can monitor multiple jobs 30 running on multiple nodes 51 or multiple CPUs if a node 51 is implemented with multiple CPUs. Multiple agents 31 can monitor different sets of jobs 30 on the same node 51. However, each job 30 is only monitored by one agent 31. In one embodiment, each node 51 is associated with only one agent 31 and in such an embodiment the monitoring agent is called the host agent. In such an embodiment, the host agent 31 monitors all jobs 30 running on that node 51.

Each agent 31 includes fault-tolerant code (a) 32 that implements the fault-tolerant operation of the agent 31. The fault-tolerant code 32 is implemented in various embodiments to monitor proper operation. In one example, the fault-tolerant code 32 makes checks using standard operating system calls to see if the monitored job 30 is still running or if the job terminated successfully or unsuccessfully. Such checks (coupled with time-out values) also detect if the hardware resources as a whole are still available to run the job. However, these checks alone may not detect deadlocks, infinite loops or other situations in which the code execution of a job is not making sufficient progress towards delivering the desired service. Often, a continuous and explicit indication of progress is needed to detect such failures. Because indications of progress tend to be application specific, the fault-tolerant code 32 in one embodiment only watches for heart-beat messages or other indicators. Each application has code 49 in a service 44 that contains the required logic to respond appropriately depending on progress. If a job terminates unexpectedly or a resource becomes unavailable, the agent 31 watching the job is responsible for restarting that job either on the same one of the nodes 51 on which it was running before or on an alternate one of the nodes 51.

The code 32 for the agents 31-1, . . . , 31-A includes a suicide protocol that operates only on the logical level of agents 31. Each hierarchy level in the fault-tolerance unit 46, uses this suicide protocol and each job 30 is only monitored by exactly one agent 31. The FIG. 4 embodiment only has a local level corresponding to local coordinator 33. Additional levels are possible as described in connection with FIG. 5.

In FIG. 4, the local coordinator 33, monitors the executions by the agents 31-1, . . . , 31-A and executes the suicide protocol in the fault-tolerant code 34. The local coordinator 33 monitors one or more agents 31. Should an agent 31 fail, the local coordinator 33 in charge of that agent 31 is responsible for restarting the failing agent 31. In turn, each particular agent 31 watches its corresponding local coordinator 33. In a case where the watched local coordinator 33 fails, the corresponding particular agent 31 being watched that detects the local coordinator 33 failure, restarts that local coordinator 33 or some alternate local coordinator such as local coordinator 33'.

The number of agents 31 used to monitor jobs 30 relative to the number of jobs 30 executing depends on many factors. In one embodiment, one agent 31 is present for each node 51. This allocation is desirable because, with such a configuration, a local job failure can be detected and corrected faster and cheaper (in terms of resources) because no network or external I/O operation is needed. Similar benefits are derived from having an agent 31 only monitor a few nodes 51. An important benefit results from having one local coordinator 33 monitor many agents 31 on different nodes because the agents 31 are collectively responsible for keeping their corresponding local coordinator 33 alive. The likelihood of proper detection and correction of such a local coordinator 33 fault increases, because it is more likely that at least one of many agents 31 will be healthy to notice the failure. It is often useful to have one local coordinator 33 per major application. If the resources are to be shared among multiple parties, each hierarchy level can allocate resources to specified parties. This allocation on a per party basis allows for full fault-tolerance and load-balancing benefits allocated on a per party basis where for a single heterogeneous cluster it is guaranteed that each node is only used by one allocated party at a time, thereby effectively constructing a dynamic wall between parties. This configuration is useful for providing allocated services via an application service provider (ASP) running in a cluster environment shared by multiple parties while providing each party with a separate service level guarantee in terms of the amount of dedicated resources that are allocated.

Figure 5:
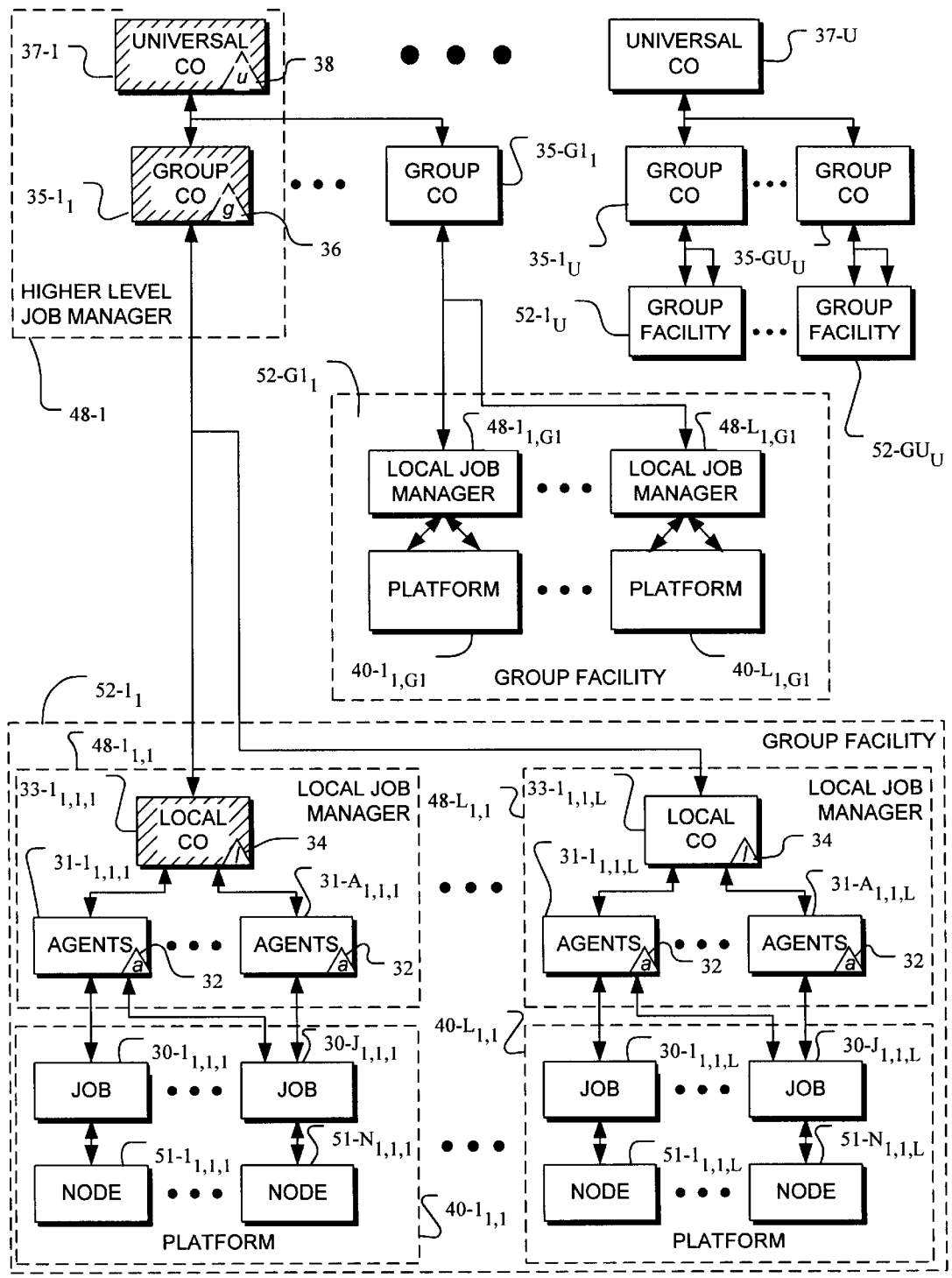
FIG. 5 depicts a logical view the multi-level hierarchy of the resource management unit with interfaces to jobs and nodes on lower level platforms.

Hierarchical Job Manager—FIG. 5

FIG. 5 illustrates job manager 48 in FIG. 3 in a multi-level hierarchical embodiment. In FIG. 5, the different hierarchical levels (namely, local, group and universal) connect from local coordinator 33 at the local level to group coordinator 35 at a group level to a universal coordinator 37 at a global level. All levels in this hierarchy have a suicide protocol implemented in the code 34, 36 and 38 of the local coordinator 33, group coordinator 35 and universal coordinator 37, respectively.

The group facility $52\text{-}1_1$ in FIG. 5 includes local job managers $48\text{-}1_{1,1}, \ldots, 48\text{-}L_{1,L}$ and platforms $40\text{-}1_{1,1}, \ldots, 40\text{-}L_{1,L}$. The local job managers 48 include the local coordinators $33\text{-}1_{1,1,1}, \ldots, 33\text{-}1_{1,1,L}$ that are the same as the local coordinator 33 in FIG. 4. The local job managers 48 include the agents $31\text{-}1_{1,1,1}, \ldots, 31\text{-}1_{1,1,L}$ and so on to the agents $31\text{-}1_{1,1,L}, \ldots, 31\text{-}1_{1,1,L}$ that are the same as the agents 31 in FIG. 4.

Each local job manager $48\text{-}1_{1,1}, \ldots, 48\text{-}L_{1,L}$ includes an instantiation of a two-level hierarchy of monitors where agents 31 are one or more first monitors and local coordinator 34 is one of one or more second monitors. The one or more first monitors (agents 31) are for monitoring first operations (for example, jobs 30) and, for any particular one of the first operations that fails, the one or more first monitors (agents 31) operate for restarting another instance of the particular one of the first operations. The one or more second monitors (local coordinator 34) are for monitoring the first monitors (agents 31) and, if any particular one of the first monitors fails (for example, agent $31\text{-}A_{1,1,1}$), the one or more second monitors (local coordinator $33\text{-}1_{1,1,1}$) operate for restarting another instance (another agent 31, for example, agent $31\text{-}1_{1,1,1}$) of the particular one of the first monitors.

The platforms 40 include the jobs $30\text{-}1_{1,1,1}, \ldots, 30\text{-}1_{1,1,L}$ and so on to the jobs $30\text{-}1_{1,1,L}, \ldots, 30\text{-}1_{1,1,L}$ that are the same as the jobs 30 in FIG. 4. The platforms 40 include the nodes $51\text{-}1_{1,1,1}, \ldots, 51\text{-}1_{1,1,L}$ and so on to the nodes $51\text{-}1_{1,1,L}, \ldots, 51\text{-}1_{1,1,L}$ that are the same as the nodes 51 in FIG. 4. In the embodiment described, the group facilities 52 of FIG. 5 have the job manager and platform architecture of FIG. 4. In an alternate embodiment, other architectures for the group facility 52 are possible on the local level while retaining the overall hierarchical structure for group and/or universal levels. This alternate embodiment is useful, for example, for integrating existing legacy systems into the multi-level hierarchy of FIG. 5.

In FIG. 5, the group coordinators 35 are responsible for monitoring the local coordinators 33. Accordingly, in one embodiment, the local coordinators 33 are monitored by the group coordinators 35 as well as by the agents 31 (as described in connection with FIG. 4). In alternate embodiments, monitoring of the local coordinators 33 is by one or the other of the group coordinators 35 or agents 31.

Each group facility 52 and group coordinator 35 includes an instantiation of a three-level hierarchy of monitors where agents 31 include one or more first monitors, local coordinators 34 include one or more second monitors and group coordinator 35 includes one of one or more third monitors. The third monitors (group coordinator 35) operate for monitoring the one or more second monitors (local coordinators 33) and, for any particular one of the second monitors that fails, the third monitors operate for restarting another instance of the particular one of the second monitors. The particular one of the third monitors (local coordinator $35\text{-}1_1$) that monitors the particular one of the second monitors ($33\text{-}1_{1,1,1}$) that fails runs on the same node (for example node $51\text{-}1_{1,1,1}$) or a different node (for example, node $51\text{-}N_{1,1}$) than the node (node $51\text{-}1_{1,1,1}$) where the particular one of the second monitors that fails runs.

Clusters 9 have platforms 40 that are grouped for monitoring in different ways. A group of clusters can consist of multiple local clusters at one location (for example, in the same building complex) or can be widely distributed at locations around the world. The content and organization of groups is described in connection with FIG. 1. Further to the discussion in connection with FIG. 1, a group can, for example, consist of a single application that runs on different clusters. A group also can run a set of applications made available to a single customer. It is then possible to provide services to different customers at widely distributed data centers rather than at one centralized location.

The universal coordinators 37 monitor the group coordinators 35 and they work together in the same way as the group coordinators 35 and the local coordinators 33 in that they each operate with a suicide protocol in code 38 and can detect and recover failures at the immediately lower level of the hierarchy. The universal coordinators 37 also are monitored by the lower level, in this case the corresponding group coordinators 35. The universal coordinators 37 are useful for monitoring an entire e-commerce system and are at the root of the hierarchical system and hence provide a good starting point for human supervision. Again, it is possible to have multiple universal coordinators, for example, one for applications that are not mission critical (such as e-entertainment) and others for mission critical applications (such as e-commerce and financial markets). A failure of a universal coordinator does not mean a failure of the entire e-commerce system within the hierarchy of the universal coordinator but merely the failure of a monitor in that hierarchy. At each level, the location and number of the groups can be chosen wisely to help avoid potential bandwidth restrictions and network delays.

In FIG. 5, the two-level relationship between the agents 31 and local coordinators 33 is the relationship of first and second monitors. Similarly, the two-level relationship between the local coordinators 33 and group coordinators 35 is the relationship of first and second monitors and the two-level relationship between the group coordinators 35 and the universal coordinators 37 is the relationship of first and second monitors.

Figure 6:
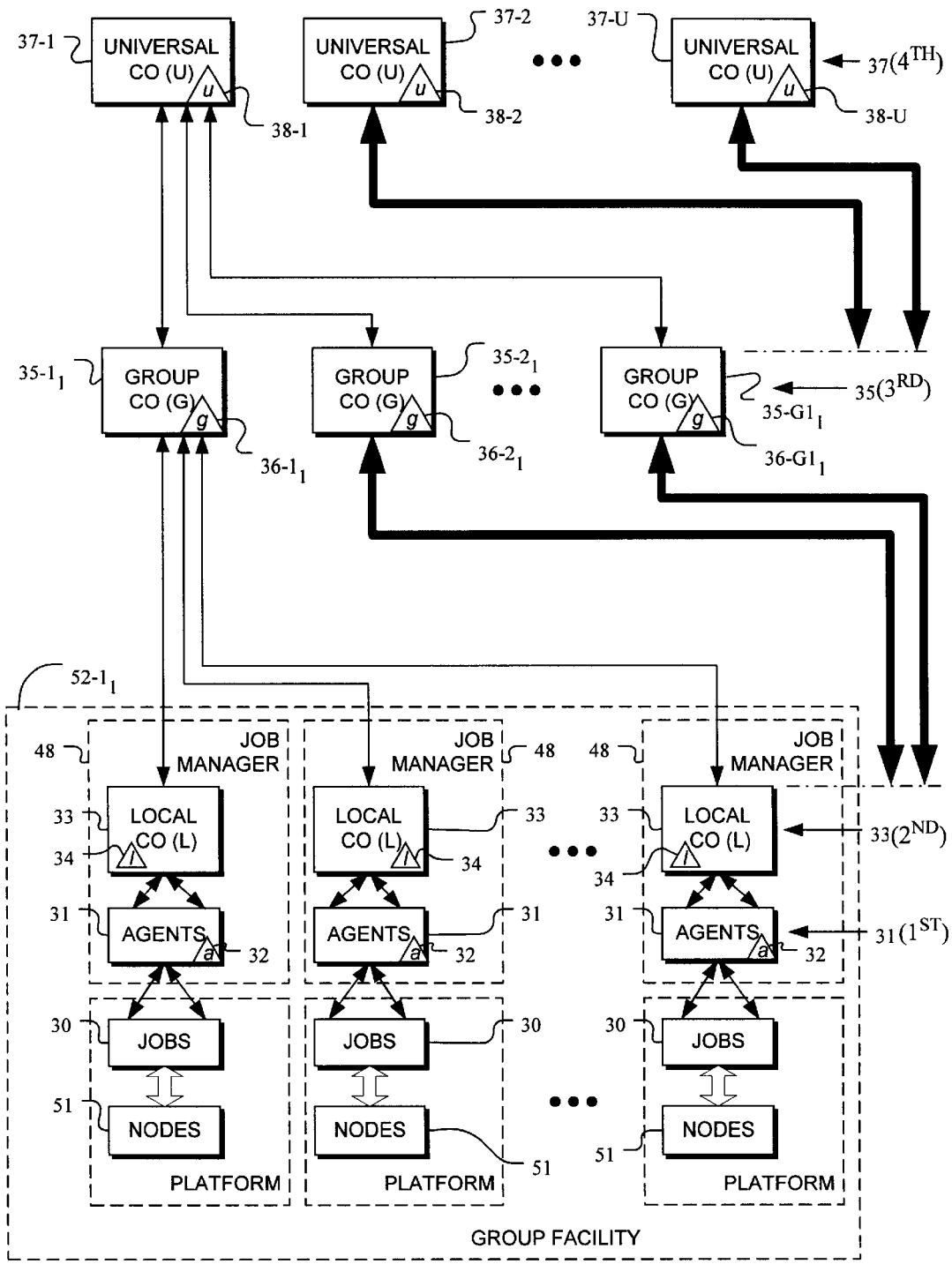
FIG. 6 depicts a logical view the multi-level hierarchy of the resource management unit with multiple universal coordinators at the universal level, with multiple group coordinators at the group level, with multiple local coordinators at the local level and with multiple agents at the agent level.

Hierarchical Job Manager—FIG. 6

FIG. 6 illustrates another representation of job manager 48 in FIG. 3 in a multi-level hierarchical embodiment like that of FIG. 5. In FIG. 6, each of the different hierarchical levels are shown aligned horizontally across the page including the universal level of universal coordinators 37, the group level of group coordinators 35 and the local level of local coordinators 33.

In FIG. 6, the universal coordinators 37-1, 37-2, . . . , 37-U include the code 38-1, 38-2, . . . , 38-U, respectively, each operating with a suicide protocol. Universal coordinator 37-1, by way of example, is the root of the group coordinators 35-1, 35-2, . . . , 35-U which include the code 38-1, 38-2, . . . , 38-U, respectively, each operating with a suicide protocol. Group coordinator $35\text{-}1_1$, by way of example, is the intermediary root of the local coordinators 33 in the group facility $52\text{-}1_1$ which in turn include the instances of code 34, each instance operating with a suicide protocol. Each local coordinator 33 is the intermediary root of corresponding agents which in each include instances of code 34 as indicated in FIG. 4, each instance operating with a suicide protocol.

The group facility 52-1, in FIG. 6 is like the group facility $52\text{-}1_1$ in FIG. 5.

Figure 7:
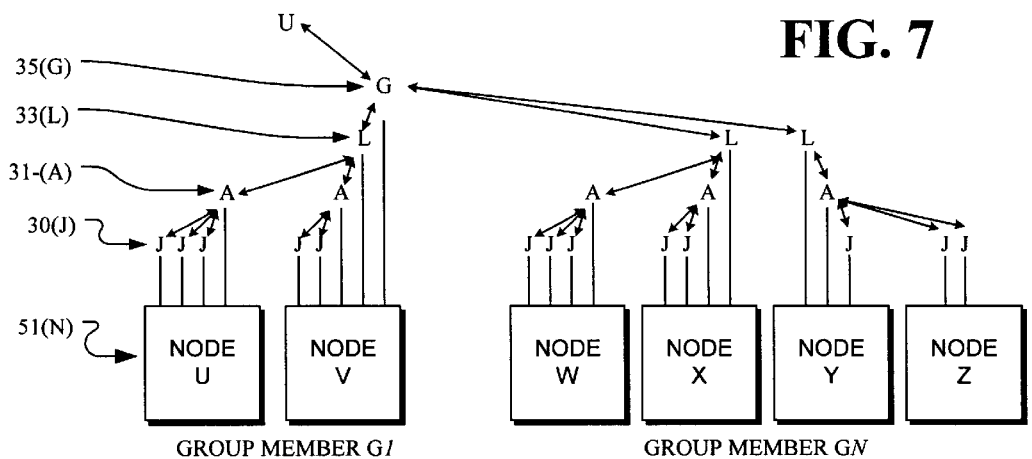
FIG. 7 depicts an example of the implementation of a group level hierarchy with vertical integration of processes of the hierarchy on some nodes.

Cluster Groups, Example I—FIG. 7

FIG. 7 depicts an example of a snapshot in time of an implementation of the hierarchy described in FIG. 5 and FIG. 6. The nodes 51(N) represent a subset of nodes, like the nodes 51 described in connection with FIG. 2 through FIG. 6, that are the hardware resources situated in two or more groups 5 where the groups 5 are of the type described in FIG. 1. In FIG. 7, the nodes 51(N) are in two groups named GROUP MEMBER GI, including node U and node V, and GROUP MEMBER GN, including nodes W, X, Y and Z. Each vertical line originating at one of the nodes 51(N) in FIG. 7 represents a module of computer code executing on that node. For example, node U has three jobs (J) and one agent (A) executing as four different modules while node V has two jobs (J), one agent (A), one local coordinator (L) and one group coordinator (G) executing as five different modules. The universal coordinator U is executing on an additional node not shown in FIG. 7. In the embodiment of FIG. 7, the code for the G, L and A levels of group member GI are logical in nature in that physically they execute on the same node (NODE V) as other processes J. The group member GI processes with multiple levels G, L, A and J have all executing code sharing the same physical resources of a common node (NODE V).

FIG. 7 shows an example with an agent 31(A) executing on node U that monitors three jobs (J) also executing on node U. FIG. 7 also shows another agent 31(A) executing on node Y and monitoring jobs (J) on multiple nodes, specifically one job (J) on node Y and two jobs (J) on node Z. FIG. 7 further shows a local coordinator 33(L) executing on node V while monitoring agents 31(A) with one agent (A) executing on node V and one agent (A) executing on node U. Because executing code often shares the same nodes, it is possible that the failure of a single machine (for example NODE V) will bring down an entire sub-tree of the hierarchy of FIG. 7. In such a situation, the recovery may require multiple steps or, in this case, a single step will recover from multiple failures. However, it is possible to entirely eliminate such situations by assigning certain hierarchy levels to a disjoint set of nodes as described in connection with FIG. 9. The advantage of the implementation in FIG. 7 is that there are no restrictions on where any code can execute and each level of the hierarchy is very close to the next lower level so that no major communication overhead is required.

Figure 8:
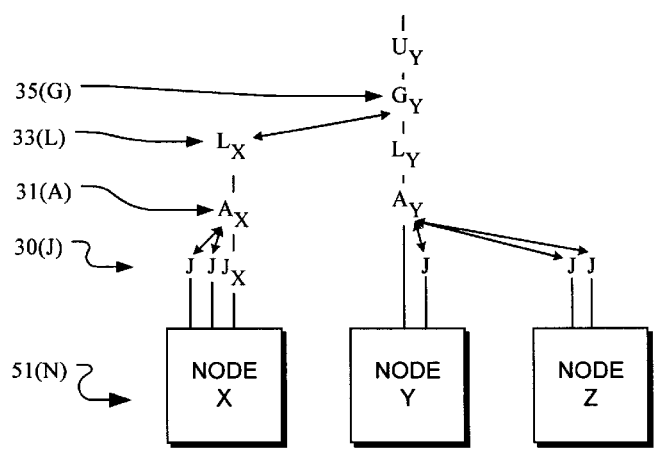
FIG. 8 depicts an example of the implementation of a group level hierarchy with vertical integration of levels of the hierarchy in single processes on some nodes.

Cluster Groups, Example II—FIG. 8

FIG. 8 depicts an example of a snapshot in time of an implementation of the hierarchy described in FIG. 5. The nodes 51(N) represent a subset of nodes, like the nodes 51 described in connection with FIG. 2 through FIG. 6, that are the hardware resources situated in one or more groups 5 of the type described in FIG. 1. Each vertical line originating at one of the nodes 51(N) in FIG. 8 represents code in a code module executing on that node. For example, node X has two jobs (J) executing in two code modules and one job ($J_X$), one agent ($A_X$) and one local coordinator ($L_X$) all executing as part of a single code module. Node Y has a universal coordinator ($U_Y$), a global coordinator ($G_Y$) and an agent ($A_Y$) all executing as code in a single module and has one job (J) executing as a separate process in a separate code module. Node Z has two jobs (J) executing in two different code modules. In the embodiment of FIG. 8 for the Node Y, the different levels of $U_Y$, $G_Y$, $L_Y$ and $A_Y$ are logical in nature in that physically they execute on the same node (NODE Y) along with another process (J) and hence all share the same physical resources. Logically, the different levels of elements of $U_Y$, $G_Y$, $L_Y$ and $A_Y$ are vertically hierarchical in that $U_Y$ monitors $G_Y$, $G_Y$ monitors $L_Y$, $L_Y$ monitors $A_Y$ and $A_Y$ monitors J. The physical nodes and the code modules that are selected for the elements of $U_Y$, $G_Y$, $L_Y$ and $A_Y$ are determined as part of the system design where factors considered in making the selection include node availability, fault tolerance and load balancing.

In the FIG. 8 example, an agent $A_X$ executing on node X monitors three jobs (J, J, $J_X$) executing on the same node (NODE X). In the FIG. 8 example, another agent $A_Y$ executing on node Y monitors jobs (J) on multiple nodes, specifically one job (J) on node Y and two jobs (J) on node Z. In the FIG. 8 example, local coordinator $L_X$ executing on node X monitors agent $A_X$ and local coordinator $L_Y$ executing on node Y monitors agent $A_Y$. As is evident from the FIG. 8 example, executing code often shares the same nodes and the same code modules so that it is possible that the failure of a single machine (for example NODE Y) or a single code module will bring down a substantial portion of the hierarchy of FIG. 8. In such a failure situation, the recovery may require multiple steps. However, it is possible to entirely eliminate such situations by assigning certain hierarchy levels to a disjoint set of nodes as described in connection with FIG. 9. The implementation in FIG. 8 has the advantage that there are no restrictions on where any code can execute and each level of the hierarchy is close to the next level so that no major communication overhead is required.

Figure 9:
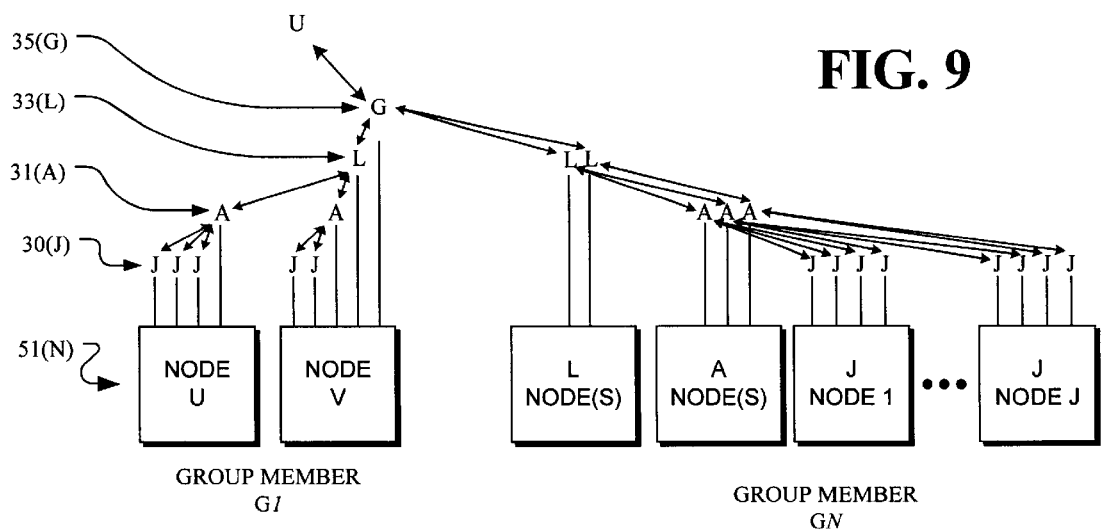
FIG. 9 depicts an example of the implementation of a group level hierarchy with horizontal integration of processes of the same levels on common nodes.

Cluster Groups, Example III—FIG. 9

FIG. 9 depicts another example of a snapshot in time of an implementation of the hierarchy described in FIG. 5 with a different allocation of monitor elements than in FIG. 7 and FIG. 8. In FIG. 9, the nodes 51(N) are in two groups named GROUP MEMBER GI, including node U and node V like in FIG. 7, and GROUP MEMBER GN, including one or more nodes L and A and including multiple nodes (J). The GROUP MEMBER GN in FIG. 9 differs from GROUP MEMBER GN in FIG. 7 in that in FIG. 9, the monitors at different levels are grouped at the same node, that is, the local coordinators 33(L) are both located on one or more L nodes, the agents 31(A) are located on one or more A nodes and the jobs 30(J) are located on one or more J nodes (J NODE 1, ..., J NODE J).

In FIG. 9, a specific set of nodes 51(L) for GROUP MEMBER GN is dedicated to run local coordinators (L) only. If one of the local coordinators L fails, agents (A) and the group coordinator (G) are only allowed to start a new local coordinator (L) on these dedicated L nodes. Typically, three nodes are sufficient to provide n+1 failure capabilities such that if one node is down for service and one node fails, the third node can still perform the job. Any number of nodes is possible. The principle of dedicated nodes for a level in the hierarchy can apply to all hierarchy levels where the use of L nodes for the L level of the hierarchy is extendable to G nodes for the G level, to A nodes for the A level and so on such that each level includes one or more dedicated nodes for that level. The universal coordinator U is executing on an additional node not shown in FIG. 9. In the FIG. 9 embodiment, for example, the nodes 51(A) for the agent level A are dedicated to running agents (A). In another embodiment, a combination of the dedicated and non-dedicated examples of FIG. 7 and FIG. 9 are employed in the same hierarchy. For example, the dedicated allocation in FIG. 9 can be applied only to the local coordinators L while an agent (A) appears on each node so that agents are not dedicated to any particular node. Such an embodiment helps prevent small errors from propagating to the group level while still allowing tree structures in part of the hierarchy.

Failure-recovery: Single Job Failure—FIG. 10

Figure 10:
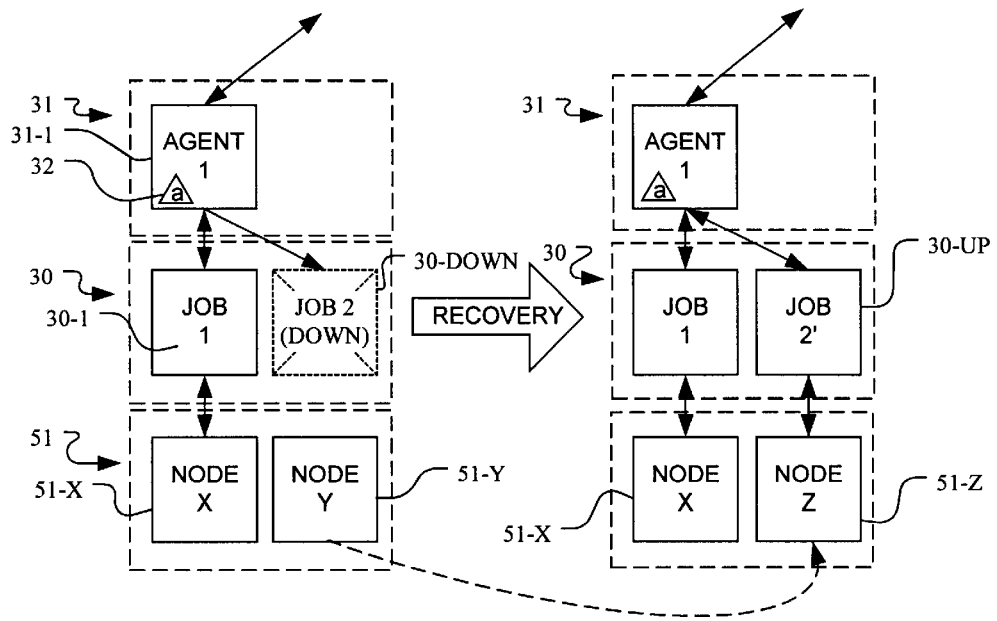
FIG. 10 depicts details of fault-detection and correction during a simple job failure.

FIG. 10 illustrates the case of failure detection and recovery where the failure is a single job (J) failure. In FIG. 10, job 2 (30-DOWN) is assumed to have failed and prior to failure was running on node 51-Y. Agent 31-1, which was monitoring job 30-1 on node 51-X as well as job 30-DOWN on 51-Y, detected the job 2 (30-DOWN) failure. The failure may have been caused by the failure of the entire node 51-Y or by any other cause. As soon as the agent 31-1 detects the failure, agent 31-1 immediately restarts the failed job, perhaps on node 51-Z if it is assumed for purposes of example that the entire node 51-Y failed. This restart is indicated by the broken line from node 51-Y to node 51-Z in FIG. 10. The restarted job on node 51-Z is labeled 2' (30-UP) because it is a new instance of the old job 2. In the general case as shown in FIG. 10, the failing node 51-Y is different from the restart node 51-Z. However, in one embodiment, a single host agent (A) on each node monitors all jobs since job failures are not anticipated to be due to failure of an entire node. In such a host agent embodiment, the host agent restarts the failing job 2 on the same node 51-Y that the job 2 was running on prior to the failure provided the node 51-Y is able to receive a restarted job.

The distributed resource management unit 46 of FIG. 3 (including the entire hierarchy of monitoring operations for agents, local coordinators, group coordinators and universal coordinators) monitors jobs at the application level. Because resource management unit 46 is only concerned about the health of a job, the cause of the failure is irrelevant and it does not matter whether the entire resource failed or if only an application failed. In either case, the goal of completing the job was not achieved. In order to prevent undesirable results from cases where a non-responding job is wrongfully assumed to have failed, the operation of the persistent storage facility $46_3$ effectively intervenes because it only accepts checkpoints and other data writes from jobs that are in good standing and rejects other jobs. When multiple instances of the same job are running, only one instance of the job is actually allowed to modify the contents of the persistent storage facility $46_3$. Effectively and as soon as duplicate jobs are detected, the duplicates are killed. The condition of more than one instance of the same job running arises, for example, when a job is restarted based upon a wrong determination that the job failed and therefore both the non-failed job and the restarted job are concurrently present until the duplicate is killed. Also, it is possible for duplicate jobs to occur when there are multiple monitoring agents for a single job. When more than one agent determines that a job has failed and both agents initiate a restart of the job before realizing that another agent has already restarted the job, duplicate jobs are started. For this is reason, one preferred embodiment has only one agent monitoring any particular job.

Failure-recovery: Vertical Failure—FIG. 11

Figure 11:
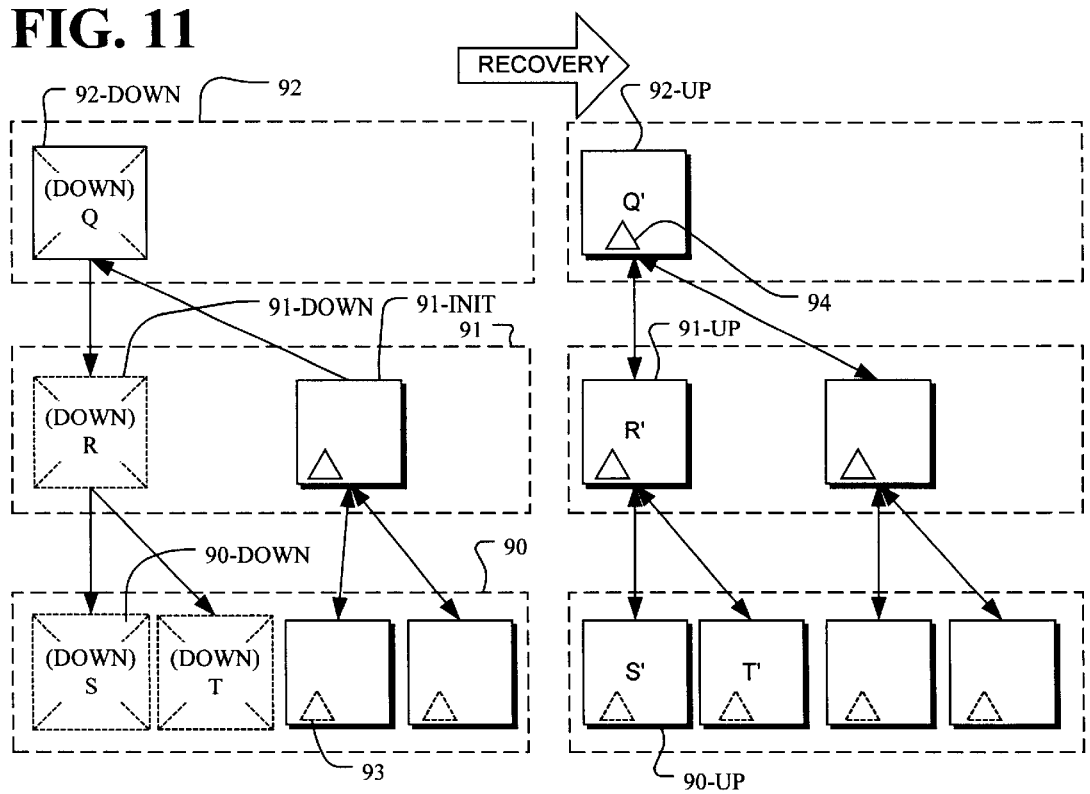
FIG. 11 depicts recovery from a vertical failure.

FIG. 11 represents a generalized vertical failure condition in a hierarchy. A vertical failure can occur for the entire tree from the universal level to the job level or for any sub-tree of the hierarchy. In FIG. 11, three levels of a hierarchy are shown, namely levels 90, 91 and 92. The procedures for fault detection and correction are preferably the same at each level and if so, the levels 90, 91 and 92 can represent any of the following sequences of levels: job, agent and local coordinator; agent, local coordinator and group coordinator; or local coordinator, group coordinator and universal coordinator. In the first case, the suicide module $9_3$ does not necessarily exist (for jobs), whereas in the other cases, the suicide module is present.

In FIG. 11, the example assumes that a vertical failure involving all of the items Q, R, S and T has occurred. The vertical failure can happen if an allocation of the type described in FIG. 7 is employed. In such an allocation, a single node failure, for example node V, will cause multiple layers of monitors and jobs running on this node to fail. There are two different procedures that can detect the vertical failure: 1) at each level, if there is an alive item that was watched by one of the now dead monitors, it will start up a new monitor and 2) if the parent of the failing sub-tree is alive, it can restart its child.

For generality, the first case is shown in FIG. 11 where Item 91-IINT lost its parent 92-DOWN and restarts it. As soon as a new instance (92-UP) of the monitor 92-DOWN is alive again, it detects (by recovering its state from the persistent storage unit $46_3$ of FIG. 3) that it was watching a process that is no longer present, namely 91-DOWN, a peer of 91-IINT. So 91-IINT immediately restarts the job 91-DOWN. As soon as the job 91-DOWN is running again, it also detects two children that are missing, namely 90-DOWN including DOWN S and DOWN T. So 91-IINT restarts 90-DOWN including DOWN S and DOWN T as well.

As indicated in FIG. 11, Q', R', S' and T' are the new instances that replace Q, R, S and T, respectively. Naturally, like in the example of FIG. 10, each of the new instances of jobs and monitors can be started up on the same node or on a different node. In the one embodiment, workload information about each node, stored in persistent storage unit $46_3$ of FIG. 3 or otherwise available, is used in determining where to start up new jobs and where to restart jobs that have failed. Generally, it is faster to recover from horizontal failures because it is a one-step process. In comparison, vertical failures need to recover each level in the failed hierarchy. This difference between horizontal and vertical failures suggests that a vertical hierarchy such as illustrated in FIG. 9 is preferable to the horizontally integrated hierarchy depicted in FIG. 10. However, vertical hierarchies provide a slightly better resource usage in the case of failure-free operation and the proper arrangement therefore can be decided on a case-by-case basis, after examining the network latencies and other factors involved.

Failure-recovery: Horizontal Failure—FIG. 12

Figure 12:
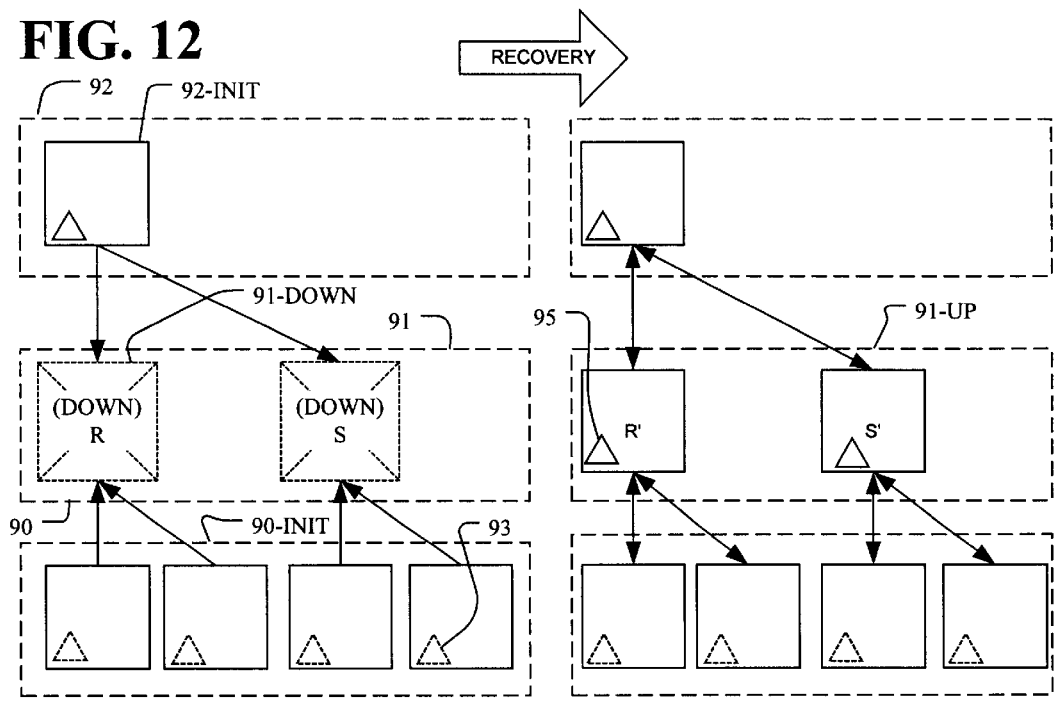
FIG. 12 depicts recovery from a horizontal failure.

FIG. 11 illustrates a generalized horizontal failure. In FIG. 12, three levels of a hierarchy are shown, namely levels 90, 91 and 92. The procedures for fault detection and correction are preferably the same at each level and if so, the levels 90, 91 and 92 can represent any of the following sequences of levels: job, agent and local coordinator; agent, local coordinator and group coordinator; or local coordinator, group coordinator and universal coordinator. In the first case, the suicide module $9_3$ does not necessarily exist (for jobs), whereas in the other cases, the suicide module is present.

In FIG. 12, for purpose of an explanation it is assumed that the items R and S have failed. This failure could happen if a setup as described in FIG. 9 is used. In such a setup, a single node failure can cause multiple items of the same hierarchy level to fail. There are two different cases where procedures can detect the failure: 1) at each level, if there is an alive item that was watched by one of the now dead monitors, it will start up a new monitor and 2) alternatively, if the different parents of the failing level are alive, they can restart their children.

Both cases are shown in FIG. 12. All of the items 90-IINT lost their parents and at the same time, item 92-IINT lost its children. Each of the items 90-IINT and the item items 92-IINT can immediately restart the dead monitors 91. As indicated in FIG. 12, R' and S' are the new instances that are replace R and S. Naturally, like in the example of FIG. 10, each of the new instances of jobs and monitors can be started up on the same node or on a different node. In the one embodiment, workload information, stored in persistent storage unit $46_3$ of FIG. 3 or otherwise available, about each node is used in determining where to start up new jobs and where to restart jobs that have failed.

Failure-recovery: Conflict Situation—FIG. 13

Figure 13:
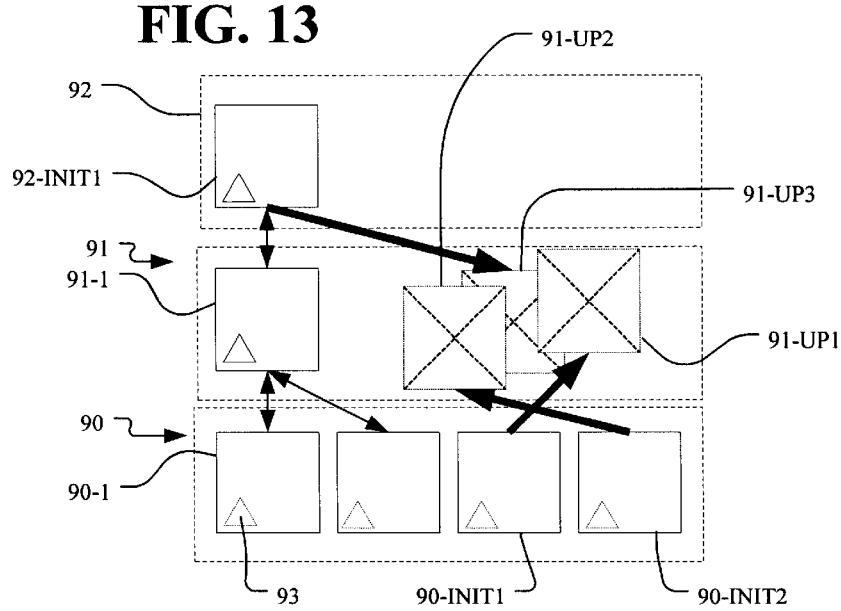
FIG. 13 depicts a conflict situation where multiple monitors replace a single failing element.

FIG. 13 provides representation of a generalized conflict situation when restarting a monitor. In FIG. 13, three levels of a hierarchy are shown, namely levels 90, 91 and 92. The procedures for fault detection and correction are preferably the same at each level and if so, the levels 90, 91 and 92 can represent any of the following sequences of levels: job, agent and local coordinator; agent, local coordinator and group coordinator; or local coordinator, group coordinator and universal coordinator. In the first case, the suicide module $9_3$ does not necessarily exist (for jobs), whereas in the other cases, the suicide module $9_3$ is present.

FIG. 13 shows a similar view to the one in FIG. 12 except that in FIG. 12 multiple items detect a single failure and try to correct it independently. The result is that multiple monitors monitoring a job can possibly interfere with each other. 91-UP1, 91-UP2, and 91-UP3 are equivalent monitors of the same hierarchy level, and exactly this interference situation should be avoided. To achieve this goal of interference avoidance, a protocol is required, especially because each of these monitors can potentially be located on different nodes or, in higher levels of the hierarchy, even possibly at remote locations around the world.

These possibilities of interference are corrected through use of the suicide modules. The suicide modules announce their existence and check for heartbeats from their peers. If it turns out that multiple monitors are monitoring the same job, all but one monitor will commit suicide. In one embodiment, a uniqueness indicator, such as the unique NIC (network interface card) ID or IP address, is used and only the monitor running on the node with the highest uniqueness indicator stays alive, while all other equivalent monitors commit suicide. However, since it is possible that multiple instances of the same monitor will get started on the same node so that the node-based ID does not establish uniqueness, then the unique process ID for the monitor is used, by way of one example, to keep only the monitor with the lowest process ID, the monitors with higher process ID's committing suicide.

In order to avoid having to use suicide protocols frequently, one embodiment also uses methods to avoid such multiple redundant monitors form being started. In one method, when a failure is detected, every item that detects the failure applies a random back-off delay before attempting to start a new monitor. If there is still no heartbeat message after the back off, the restart is triggered. In practice it was shown that the back-off is an effective method for avoiding multiple instances of redundant monitors. In an additional method, all peers are notified via a broadcast message that the restart of a monitor has taken place. As soon as the other peers receive this broadcast message, they stop their restart attempts and start sending heartbeats again. In one embodiment, different back-off times were used for the local area and the wide area which, among other things, compensates for greater latency due to longer communication paths and times.

In one implementation, the monitors initiate all heartbeat activity with the level below them. The absence of a heartbeat from the monitor alerts the monitored level to initiate recovery of the monitor. Duplicate monitors discover each other as they poll (heartbeat) the monitored processes. This polling is how the election process is effected. Each monitor sends it's election value to each monitored process. In the case of the coordinator/hostagent, the coordinator sends its election value to each host agent when it polls for heartbeat. The hostagent compares this election value with the one from previous polls and keeps the "best" one. This best value is returned in its responses to coordinator polls. A coordinator receiving a "better" election value back from a hostagent executes its suicide function since there is another coordinator running that has a "better" election value. Once a coordinator has polled all hostagents on the network, it can be sure it is the only coordinator left running. Until a new coordinator has completed one complete poll cycle, it behaves in a passive way. It does not perform recovery of other components and it does not perform load balancing.

Figure 14:
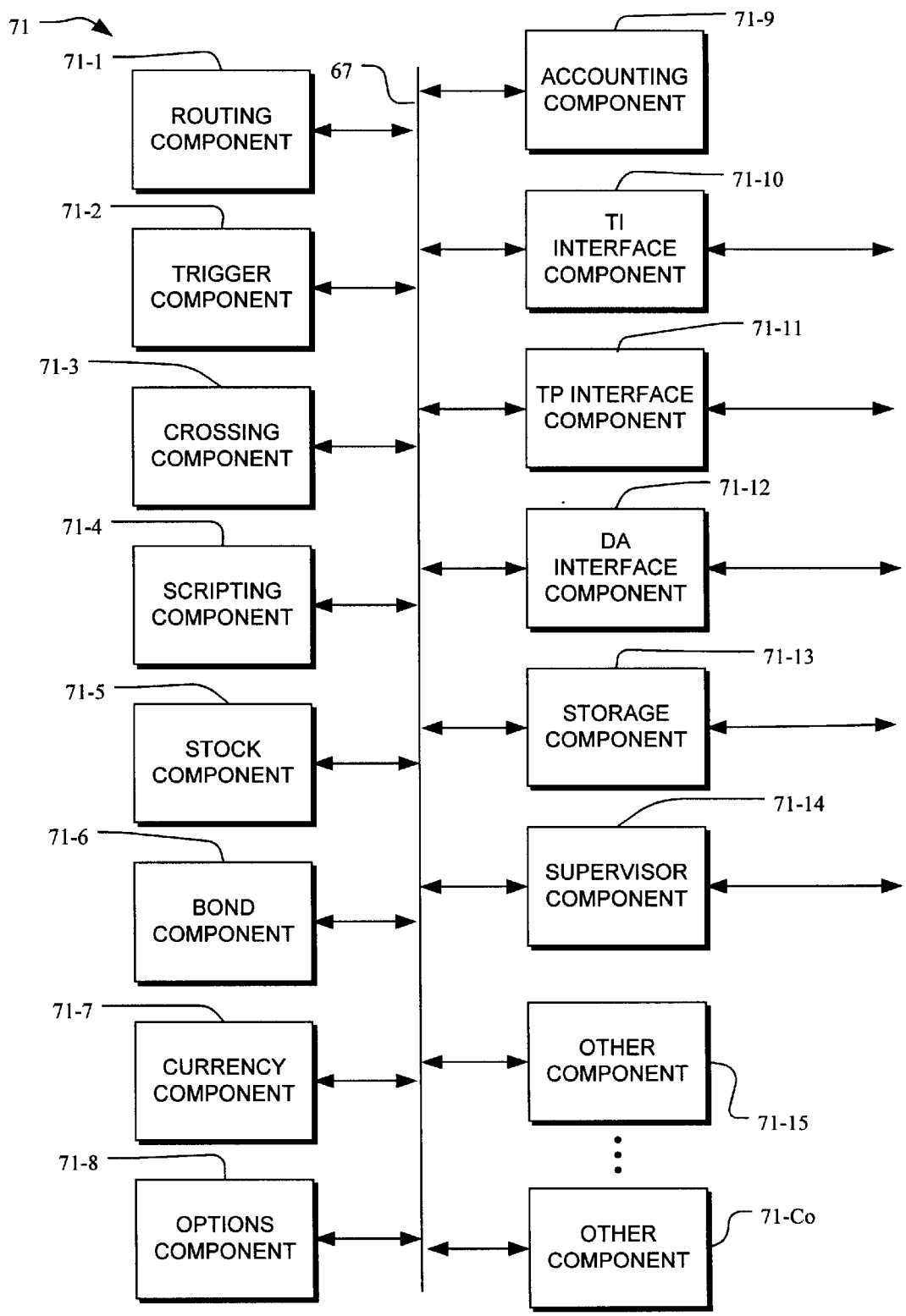
FIG. 14 depicts examples of components relevant for financial services where the components are implemented as services on cluster computer system.

Market Engine—FIG. 14

The clustering system 2 of FIG. 1 is beneficially employed to implement components of a market engine in FIG. 14. Details of market engine having the components of FIG. 14 are described in the above-identified cross-referenced application entitled MARKET ENGINES HAVING EXTENDABLE COMPONENT ARCHITECTURE. The components 71-1, 71-2, . . . , 71-Co, are interconnected by connection element 67. The connection element 67 is a logical entity that provides the necessary physical interconnection and protocol for each of the components 71.

In FIG. 14, the components 71 include, for example, a routing component 71-1, a trigger component 71-2, a crossing component 71-3, a scripting component 71-4, a stock component 71-5, a bond component 71-6, a currency component 71-7, an options component 71-8, an accounting component 71-9, a TI interface component 71-10, a T.P. interface component 71-11, a DA interface component 71-12, a storage component 71-13, a supervisor component 71-14 and other components 71-15, . . . , 71-Co. One or more or all of the components 71 of FIG. 14 are implemented as services in the service unit 44 of FIG. 3. In this manner, the hierarchical fault tolerance described in the embodiments of the present invention are applied to the market engine components of FIG. 14.

Figure 15:
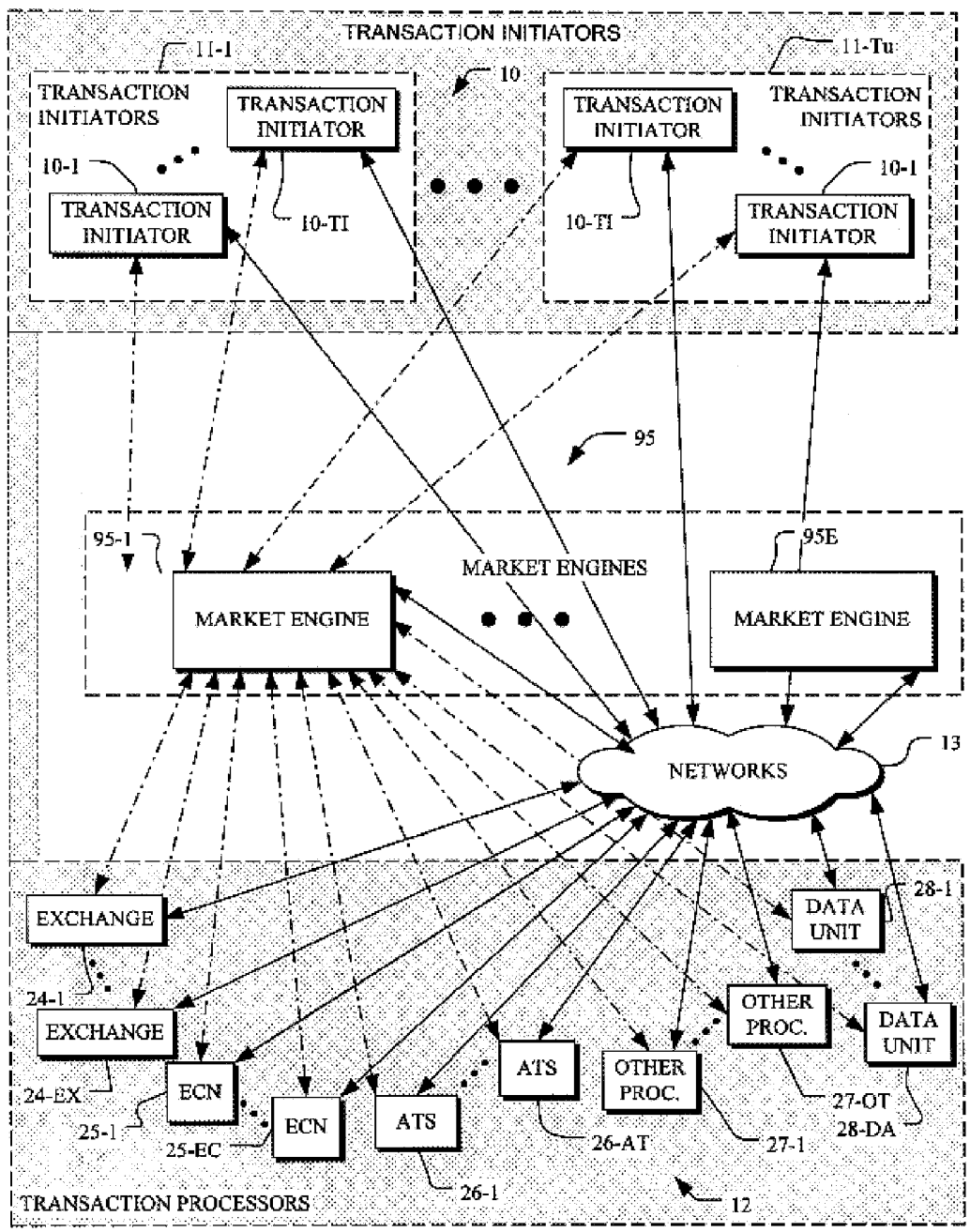
FIG. 15 depicts an example of an e-commerce system using the components of FIG. 14.

E-commerce System—FIG. 15

FIG. 15 depicts an e-commerce system that employs the fault-tolerance framework previously described for performing e-commerce transactions. Transactions in the system of FIG. 15 are initiated, in some instances, with transaction initiators 10 in transaction units 11, including units 11-1, . . . , 11-Tu where each of the units 11 includes transaction initiators 10'-1, . . . , 10'-TI. Transactions are processed, in some instances, in transaction processors 12. The transaction initiators 10 and the transaction processors 12 are collectively referred to as transaction units 7. The transaction initiation and processing is supervised by one or more market engines 95, designated as market engines 95-1, . . . , 95E. In some embodiments, one or more of the market engines 95 are capable of initiating and processing transactions internally, having the equivalent of transaction initiators 10 and/or transaction processors 12 internal to the market engine, and are then characterized as integrated market engines.

In FIG. 15, the transaction initiators 10 are, for example, users that include computers, terminals and other equipment and software useful for persons (individuals or companies) to electronically connect to an e-commerce system. Alternatively, the transaction initiators may be brokers. Brokers include computers, terminals and other equipment and software useful for persons (individuals or companies) acting as brokers for users to electronically connect to an e-commerce system. The transaction initiators in FIG. 15 can be of the user-only type of transaction initiator, can be of the broker-user type of transaction initiator or can be of any other type. Any number of such transaction initiators 10 of different types can be used in an electronic system of FIG. 15 for initiating electronic transactions. As additional examples, hierarchies of brokers, funds, institutions and users are included, such as broker-broker, user-user, broker-broker-user-user. A hierarchy in any depth or configuration can exist.

The market engines 95 respond to initiated transactions and supervise interaction among the transaction initiators 10, the transaction processors 12 and the different market engines 95 to control the routing of the initiated transactions, the processing of transactions and the coordinating, gathering, storing and distributing of information useful for transaction supervision and processing. In some embodiments, historical data is used in this routing process to take advantage of statistical patterns in the processing performed in external transaction processors. Such historical data includes execution price and depth of the market among others things.

In the FIG. 15 system, the market engines 95 are able to access and maintain information about transactions collectively as well as about each of the individual transactions being processed in the market engines 95. Where high reliability in transaction handling is required, the connections among transaction units 7 and market engines 95 are redundant or are otherwise configured to ensure high reliability and high availability using the fault-tolerance framework previously described.

In the FIG. 15 system, connections among the transaction initiators 10, the transaction processors 12 and the different market engines is generically shown through networks 13, but it is to be understood that such connections in networks 13 can include direct connections among the transaction initiators 10, the transaction processors 12 and the different market engines 95.

In FIG. 15, the transaction processors 12 include one or more conventional (or non-conventional) exchanges 24. The exchanges include, for example, conventional exchanges 24-1, . . . , 24-EX, which are, for example, the New York Stock Exchange (NYSE), Chicago Mercantile Exchange, National Association of Securities Dealers Automated Quotation System (NASDAQ), and other similar exchanges. In the FIG. 15 embodiment, the transaction processors include the alternative trading systems (ATS) and particularly, ATS 26-1, . . . , 26-AT. The transaction processors also include electronic communication networks (ECN) including the ECN 25-1, . . . , 25-EC. Any number of other transaction processors 27 are possible in the transaction processors 12 of FIG. 15, and these are generically indicated as the other transaction processors 27-1, . . . , 27-OT. Other transaction processors include Clearing Houses for example. Some of the transaction processors 12 in FIG. 15 include data components for receiving or providing data relevant to transactions and these data components are designated as the data components 28-1, . . . , 28-DA. Such data components typically provide information about one or more of the other transaction processors such as the exchanges 24, ECNs 25 and the ATSs but also can provide any other type of data such as weather data, company earnings, political and economic data and so forth. Also, the data components may store data, provide data for quotations and otherwise act in any capacity to serve or receive data of all types.

In FIG. 15, the functional flow of information is shown by broken lines, while physical connections of the transaction initiators 10, market engines 95 and transaction processors 12 are generally through direct connections to the network 13 as shown by solid lines.

Figure 16:
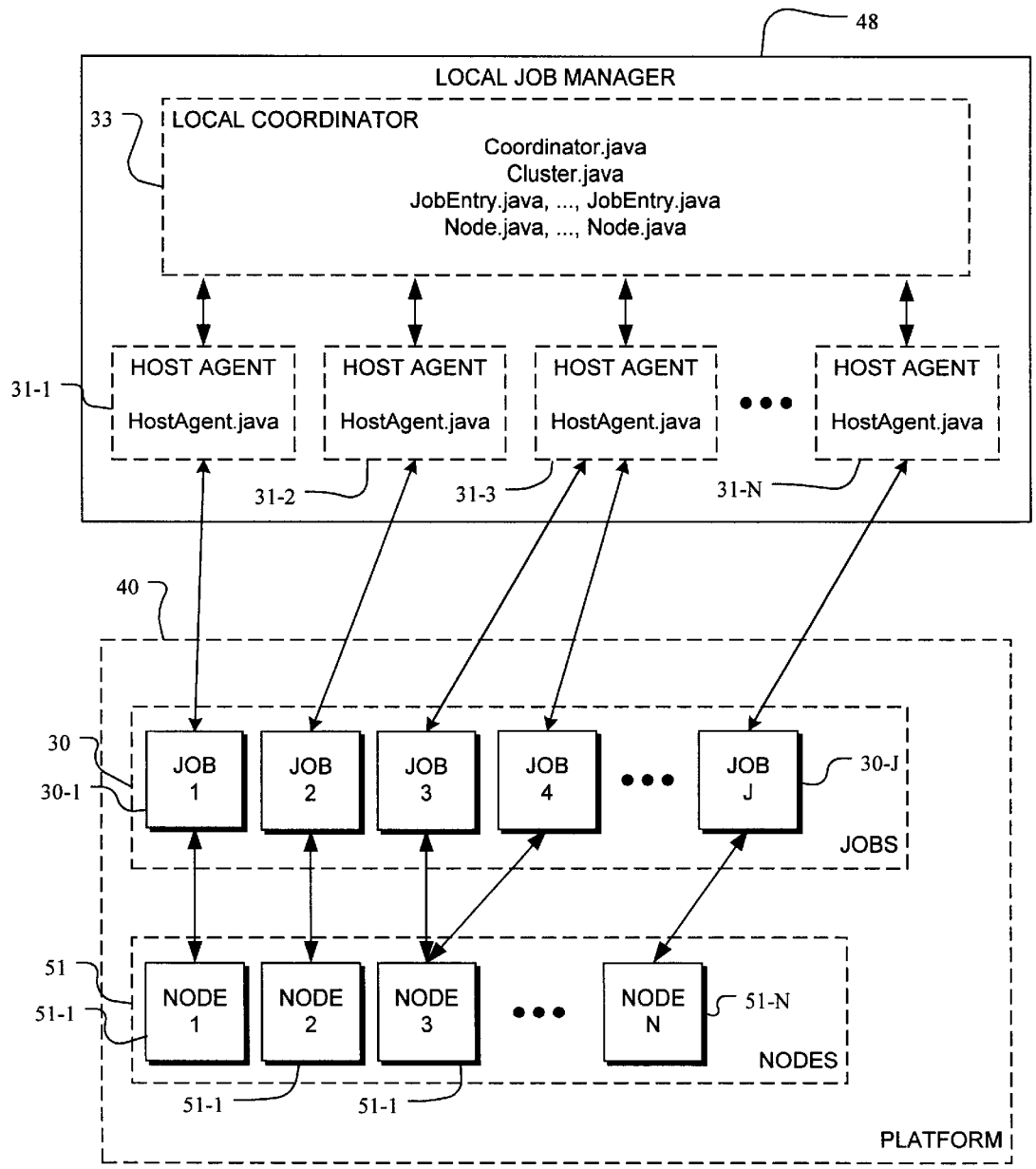
FIG. 16 depicts a logical view of the local job manager running with host agents at levels in the hierarchy above jobs running on nodes of a platform.

Local Job Manager With Single Host Agent—FIG. 16

FIG. 16 depicts a logical view of the hierarchy of a local job manager 48, which is one embodiment of the job manager 48 of FIG. 3, together with the local platform 40 including the jobs 30 and nodes 51 on which the jobs execute. The nodes 51, including nodes 51-1, . . . , 51-N in local platform 40, are any set of all or some of the nodes 51 for the clusters 9 of FIG. 2. These nodes 51 in FIG. 16 are implemented using suitable computational devices, such as workstations, servers or mainframes, with single-processor or multi-processor configurations. The nodes 51 are the resources that are assigned for executing the jobs 30 that perform the services 44 of FIG. 3.

In FIG. 16, the jobs 30, including jobs 30-1, . . . , 30-J are, for example, programs, threads, executable code or data structures that are useful in providing data processing services 44. For fault-tolerant operation, the jobs 30 are monitored for proper operation, execution and termination. Each job 30 runs on one node 51 and multiple jobs 30 can run on the same node 51 so that there can be a many-to-one mapping of jobs to nodes. In the example of FIG. 16, Job 1 runs on Node 1, Job 2 runs on Node 2, Job 3 and Job 4 both run on Node 3 and Job J runs on Node N. By way of one example, a job 30 may be part of a crossing engine implementation which functions to cross buy and sell orders for financial instruments and may be allocated for a particular symbol (such as IBM, Intel or other traded stock instruments). That is, in one embodiment, one job may cross shares of IBM, another job may cross shares of Intel, a still another job may cross shares of Inktomi and so on. In another embodiment, a single job may cross shares of IBM, shares of Intel, shares of Inktomi and so on.

In FIG. 16, the local job manager 48 is implemented as code modules including the Coordinator.java, Cluster.java, JobEntry.java, Node.java, and HostAgent.java modules. In the local job manager 48, the Coordinator.java, Cluster.java, and multiple instances of the JobEntry.java and Node.java modules are part of the local coordinator 33. Multiple instances of the HostAgent.java module are used in multiple instances of the Host Agent. In the example described, the Java language is employed for the modules but any other language such as C/C++ can also be used to avoid the additional complexity introduced by the Java Virtual Machine (JVM). In one embodiment, the fault-tolerance framework is compiled to machine code. The implementation of the host agent is desirably kept simple (and therefore reliable) because it is the most important component (software and hardware) in the system for achieving overall system reliable operation.

In the example described, system startup occurs when one or more machines start running HostAgents. To start the HostAgents, a shell script HostAgent.sh is executed. The HostAgent.sh script is marked as a startup script in the operating system such that it executes automatically whenever the system is rebooted. The HostAgent.sh script is also be executed by Coordinator.java whenever the coordinator detects that a HostAgent is not responding. The HostAgent.sh script does the following:

1) Defines the hostname where the HostAgent is to run
2) Defines the port at which the HostAgent listens to commands
3) Sets the permissions for reading and writing to this port among others
4) Starts MEC.Hydra.HostAgent The "MEC.Hydra." prefix identifies all the programs that are in a common package and the filename that gets executed is HostAgent.class, which has HostAgent.java as its source code.

In the example described, after system startup occurs and the shell script HostAgent.sh has executed, one or more machines start running HostAgents. If no Coordinator exists, the one or more HostAgents will initiate one or more Coordinators and one Coordinator will survive and take control. Then, the Coordinator.java module manages overall control of the cluster of nodes 51 in platform 40. The Coordinator.java module initializes the state of the system, handles parameters and performs other house-keeping operations. The Cluster.java module maintains the state of the cluster of nodes 51 in platform 40. The Coordinator.java module uses the Cluster.java module to poll the host agents 31 (or alternatively the nodes 51 directly) for the alive status of the nodes 51, tracks where jobs 30 are running and, in certain embodiments, moves jobs 30 when their nodes 51 become unavailable. The Node.java module maintains node level information and an instance of Node.java is initiated for each active node 51. The Node.java module tracks which jobs are running on each node 51, the node status and which services are available on each node. The JobEntry.java module manages information about each job running in the cluster of nodes 51 in platform 40 and an instance of JobEntry.java is initiated for each job and is referenced to the corresponding Node.java instance.

In FIG. 16, host agents 31, including host agents 31-1, . . . , 31-N, are monitored by the local coordinator 33 and each HostAgent.java module monitors the jobs that are executing on a corresponding node.

Examples of code modules representing one embodiment of FIG. 16 are included in the following lists including HostAgent.sh in LIST_1, Coordinator.java in LIST_2, Cluster.java in LIST_3, JobEntry.java in LIST_4, Node.java in LIST_5, HostAgent-1.java in LIST_6 and HostAgent-2.java in LIST_7.

The HostAgent-1.java module is an example used where one job executes crossings for multiple symbols and the HostAgent-2.java module is an example used where multiple jobs are run for executing crossings of symbols. The jobs can be allocated with one job per symbol, multiple jobs per symbol, one job for an entire service, one job for a group of symbols or with any other configuration. When a job manages multiple symbols and such a job becomes unavailable on an otherwise functioning node, only the dying subset of the symbols that are processed on the functioning node need be restarted. In addition, different types of jobs can be monitored by the same HostAgent, for example, a job for a shopping service and a job for a crossing service. The HostAgent-1.java module and the HostAgent-2.java module can each be run separately or together, for example, on the same node. If run together, the message terminology can be harmonized where for example, the sendStopMessage command calls the killjob message and the sendStartMessage command calls the startJob command.

```
LIST 1: HostAgent.sh
Copyright 2000 Market Engine Corporation package MEC.Hydra;

This script starts the HostAgent.
##It starts the RMI registry and host agent code in the background.
##---------------------------------------------------------------
##First, start the RMI registry.
HOSTAGENT_PORT=3001
/bin/rmiregistry $HOSTAGENT_PORT &
##---------------------------------------------------------------
##now start the HostAgent server program
PERMIT_FILE=/home/hydra/permit
HOSTNAME='hostname'
    /bin/java-Djava.security.policy=$PERMIT_FILE MEC.Hydra.HostAgent
$HOSTNAME
$HOSTAGENT_PORT &
exit 0
##---------------------------------------------------------------
```

```
LIST 2: Coordinator.java
Copyright 2000 Market Engine Corporation package MEC.Hydra;
import . . . ;
...
import . . . ;
// Example Coordinator uses Java and implements an RMI interface
for communication
public class Coordinator extends UnicastRemoteObject
    implements CoordinatorRMI {
    //
    // Constructors
    //
    public Coordinator( ) throws RemoteException {
        super( );
    }
...
    //
    // Private data
    //
...
```

```
LIST 2: Coordinator.java
Copyright 2000 Market Engine Corporation private static String Hostname;    // Local host of the Coordinator
    private static Cluster cluster;    // Cluster to supervise (coordinate)
...
    //
    // Public methods
    //
    public static String getHostName( ) {
        String hostname;
        try {
            InetAddress addr = InetAddress.getLocalHost( );
            hostname = addr.getHostName( );
        } catch (UnknownHostException err) {
            hostname = new String("localhost");
        }
        return hostname;
    }
    //
    // RMI callable methods
    //
    public String startJob(String jobname) throws RemoteException {
        String nodename;
        //System.out.println("Coordinator: startJob" + jobname);
        cluster.addJob(jobname);
        nodename = cluster.locateJob(jobname);
        //System.out.println("Coordinator: startJob: nodename" +
        nodename);
        return new String(nodename);
    }
...
    public String locateJob(String jobname) throws RemoteException {
        String nodename;
        nodename = cluster.locateJob(jobname);
        return new String(nodename);
    }
    //
    // Private methods
    //
    private static void poll( ) {
        while (true) {
            try {
                Thread.sleep(15 * 1000);
            } catch (InterruptedException err) {
                // Ignore
            }
            //cluster.checkJobs( );
// Notes or jobs can be checked here every n milliseconds.
// In this case, n = 15 x 1000 = 15 seconds. However, in this example
// implementation, the poller( ) method in cluster java is used instead.
        }
    }
    public static void run boolean demo {
        System.out.println("Coordinator must run on Dispatcher node");
        Hostname = getHostName( );
        cluster = new Cluster(Hostname);
        // Create and install a security manager
        if (System.getSecurityManager( ) == null) {
            System.setSecurityManager(new
SecurityManager( ));
        }
...
        try {
            String rminame;
            Coordinator obj = new Coordinator( );
            rminame = Parameters.RmiName(Hostname, "Coordinator");
            Naming.rebind(rminame, obj);
            System.out.println("Coordinator:bind" + rminame);
        } catch (Exception err) {
            System.out.println("Coordinator err:" + err.getMessage( ));
            err.printStackTrace( );
        }
...
        if (demo) {
            Node node;
            // For illustration, some nodes are added here and the 'VECN'
            // job is assigned and started on each of the nodes. In
            // deployment, no nodes are explicitly assigned but they are
```

LIST 2: Coordinator.java
Copyright 2000 Market Engine Corporation

```
            // rather detected by the coordinator when an
            // agent is started on a node.
                node = new Node("nasdaq", cluster);
                node.addProgram("VECN");
                cluster.addNode(node);
                node = new Node("nyse", cluster);
                node.addProgram("VECN");
                cluster.addNode(node);
                node = new Node("cbo", cluster);
                node.addProgram("VECN");
                cluster.addNode(node);
            }
        }
        public static void main(String args[ ]) {
            run(true);
        // starts the coordinator and because demo is set to true, it will
        // also start the VECN job on 3 nodes.
        }
}
```

LIST 3: Cluster.java
Copyright 2000 Market Engine Corporation

```
package MEC.Hydra;
import . . . ;
...
import . . . ;;
// Cluster is used by Coordinator - java to keep track of jobs and nodes
public class Cluster extends Thread {
    //
    // Private data
    //
    private String Hostname = null;
    private Hashtable nodes = null;
    private Hashtable jobs = null;
    private int nodecount = 0;
    private int jobcount = 0;
...
    //
    // Constructors
    //
    public Cluster (String hostname) {
        Hostname = hostname;
        nodes = new Hashtable( );
        jobs = new Hashtable( );
        start( );
    }
...
    //
    // Node methods
    //
    // Called when the coordinator detects a new node in the clusters
    // or when it explicitly starts a new node in the demo.
    public void addNode(Node node) {
        String nodename = node.getNodeName( );
        if (! nodes.containsKey(nodename)) {
            nodecount++;
            nodes.put(nodename, node);
        }
    }
    // called if the coordinator detects the failure of an entire node or
    // when a node is removed for servicing
    public void removeNode(String nodename) {
        if (nodes.containsKey(nodename)) {
            nodes.remove(nodename);
            nodecount--;
        }
    }
    public Node getNode(String nodename) {
        if (nodes.containsKey(nodename)) {
            return (Node) nodes.get(nodename);
```

LIST 3: Cluster.java
Copyright 2000 Market Engine Corporation

```
        } else {
            return null;
        }
    }
...
    // Job methods
    // called whenever the coordinator starts (and begins monitoring)
    // a new job anywhere on the cluster.
    public void addJob(String jobname) {
        if (! jobs.containsKey(jobname)) {
            jobcount++;
            jobs.put(jobname, new JobEntry(jobname));
        }
    }
    // called when a job terminated successfully or is no longer
    // watched by the coordinator.
    public void removeJob(String jobname) {
        if (jobs.containsKey(jobname)) {
            JobEntry job = (JobEntry) jobs.get(jobname);
            stopJob(job);
            jobs.remove(jobname);
            jobcount--;
        }
    }
    public int countJobs( ) {
        return jobcount;
    }
    public String locateJob (String jobname) {
        String nodename = null;
        //System.out.println("Cluster: locateJob: " + jobname);
        if (jobs.containsKey(jobname)) {
            //System.out.println("Cluster: locateJob: ok");
            JobEntry job = (JobEntry)jobs.get(jobname);
            nodename = job.getNodeName( );
        }
        //System.out.println("Cluster: locateJob: nodename" +
        nodename);
        return nodename;
    }
...
    //
    // private methods
    //
    // Find a running node that can accept more jobs. This version
    // finds the running node that has the fewest jobs. (For equal
    // load distribution upon startup).
    private Node findNode(String Progname) {
        Enumeration en;
        Node bestnode = null;
        for (en = nodes.elements( ); en.hasMoreElements( );) {
            Node node = (Node)en.nextElement( );
            if (node.isRunning( )) {
                if ((bestnode == null) ||
                    (node.countJobs( ) <bestnode.countJobs( )))
                    bestnode = node;
            }
        }
        return bestnode;
    }
    // Find a running node that can accept more jobs. This version
    // finds the running node that has the fewest jobs.
    private Node findNode( ) {
        Enumeration en;
        Node bestnode = null;
        for (en = nodes.elements( ); en.hasMoreElements( );) {
            Node node = (Node)en.nextElement( );
            if (node.isRunning( )) {
                if ((bestnode == null) ||
                    (node.countJobs( ) <bestnode.countJobs( )))
                    bestnode = node;
            }
        }
        return bestnode;
    }
    private void startJob(JobEntry job) {
        Node node = findNode( );
```

-continued

LIST 3: Cluster.java
Copyright 2000 Market Engine Corporation

```
        if (node != null) {
            System.out.println("Cluster: startJob: node" +
                node.getNodeName( ) + "job" + job.getJobName( ));
            node.addJob(job);
            //route(job);
        }
    }
    private void stopJob(JobEntry job) {
        Node node;
        node = job.getNode( );
        if (node != null)
            node.removeJob(job);
    }
    private void failJob(JobEntry job) {
        Node node = job.getNode( );
        node.failJob(job);
    }
    private void checkNodes( ) {
        Enumeration en;
        System.out.println("Cluster: Available Nodes:");
        for (en = nodes.elements( ); en.hasMoreElements( );) {
            Node node = (Node)en.nextElement( );
            node.pollNode( );
            if (node.isRunning( ))
                System.out.println("\tup" + node.getNodeName( ));
            else
                System.out.println("\tdown" + node.getNodeName( ));
        }
    }
    private void checkJobs( ) {
        Enumeration en;
        for (en = jobs.elements( ); en.hasMoreElements( );) {
            JobEntry job = (JobEntry)en.nextElement( );
            if (job.isRunning( )) {
                Node node = job.getNode( );
                if (!node.isRunning( )) {
                    failJob(job);
                }
            } else {
                String jobname = job.getJobName( );
                startJob(job);
            }
        }
    }
    private void poller( ) {
        System.out.println("Hostname:" + Hostname);
        System.out.println("Cluster: poller");
        while (true) {
            try {
                Thread.sleep(10000);
// In this example, nodes and jobs are polled every 10 seconds.
            } catch (InterruptedException e) {
                // Ignore
            }
            checkNodes( );
            checkJobs( );
        }
    }
    ...
    public void run( ) {
        poller( );
// Cluster.java is used by coordinator.java as a thread. When the
// thread is run,
// Cluster.java automatically starts polling the nodes and jobs
// in behalf of the coordinator.
    }
}
```

LIST 4: Jobentry.java
Copyright 2000 Market Engine Corporation

```
package MEC.Hydra;
import . . . ;
...
import . . . ;
// used by cluster.java to keep to keep track of its jobs and the states
// of each job. These are mostly synchronized to ensure proper
   state transitions.
public class JobEntry {
public static int IDLE = 0;
public static int WANTRUN = 1;
public static int STARTING = 2;
public static int RUNNING = 3;
public static int WANTSTOP = 4;
public static int STOPPED = 5
...
private Node node = null;
private String progname = null;
private String jobname = null;
private boolean debug = false;
...
protected int state = IDLE;
...
//
// Constructors
//
public JobEntry(String progname, String jobname) {
    this.progname = new String(progname);
    this.jobname = new String(jobname);
}
...
//
// public methods
//
// Deprecated
public JobEntry(String jobname) {
    this("VECN", jobname);
}
public void setDebug(boolean d) {
    debug = d;
}
public synchronized boolean isRunning( ) {
    return ((state != IDLE) && (state != STOPPED));
}
public synchronized boolean isStopped( ) {
    return ((state == IDLE) || (state == STOPPED));
}
public synchronized String getProgName( ) {
    return new String(progname);
}
public synchronized String getJobName( ) {
    return new String(jobname);
}
public synchronized String getNodeName( ) {
    String nodename = null;
    if (node != null) {
        nodename = node.getNodeName( );
    }
    return nodename;
}
public synchronized Node getNode( ) {
    return node;
}
public synchronized boolean addJob(Node node) {
    if (state == IDLE) {
        if (debug)
            System.out.println("JobEntry: addJob" + jobname +
                "on" + node.getNodeName( ));
        state = WANTRUN;
        this.node = node;
        return true;
    }
    System.out.println("JobEntry: addJob" + jobname +
        "on" + node.getNodeName( ) + "failed, state" + state);
    return false;
}
public synchronized boolean removeJob( ) {
```

LIST 4: Jobentry.java
Copyright 2000 Market Engine Corporation

```java
        if (state == STOPPED) {
            if (debug)
                System.out.println("JobEntry: removeJob" + jobname +
                    "on" + node.getNodeName( ));
            state = IDLE;
            node = null;
            return true;
        }
        if (state == IDLE) {
            System.out.println("JobEntry: removeJob" + jobname +
            "failed");
        } else {
            System.out.println("JobEntry: removeJob" + jobname +
                "on" + node.getNodeName( ) + "failed, state" + state);
        }
        return false;
    }
    public synchronized boolean startJob( ) {
        if (state == WANTRUN) {
            if (debug)
                System.out.println("JobEntry: startJob" + jobname +
                    "on" + node.getNodeName( ));
            state = STARTING;
            return true;
        }
        if (state == IDLE) {
            System.out.println("JobEntry: startJob" + jobname +
            "failed");
        } else {
            System.out.println("JobEntry: startJob" + jobname +
                "on" + node.getNodeName( ) +
                "failed, state" + state);
        }
        return false;
    }
    public synchronized boolean startedJob( ) {
        if (state == STARTING) {
            if (debug)
                System.out.println("JobEntry: startedJob" + jobname +
                    "on" + node.getNodeName( ));
            state = RUNNING;
            return true;
        }
        if (state == IDLE) {
            System.out.println("JobEntry: startedJob" +
            jobname + "failed");
        } else {
            System.out.println("JobEntry: startedJob" + jobname +
                "on" + node.getNodeName( ) + "failed, state" + state);
        }
        return false;
    }
    public synchronized boolean stopJob( ) {
        if (state == RUNNING) {
            if (debug)
                System.out.println("JobEntry: stopJob" + jobname +
                    "on" + node.getNodeName( ));
            state = WANTSTOP;
            return true;
        }
```

LIST 4: Jobentry.java
Copyright 2000 Market Engine Corporation

```java
        if (state == IDLE) {
            System.out.println("JobEntry: stopJob" + jobname +
            "failed");
        } else {
            System.out.println("JobEntry: stopJob" + jobname +
                "on" + node.getNodeName( ) + "failed, state" + state);
        }
        return false;
    }
    public synchronized boolean stoppedJob( ) {
        if (state == WANTSTOP) {
            if (debug)
                System.out.println("JobEntry: stopJob" + jobname +
                    "on" + node.getNodeName( ));
            state = STOPPED;
            return true;
        }
        if (state == IDLE) {
            System.out.println("JobEntry: stopJob" + jobname +
            "failed");
        } else {
            System.out.println("JobEntry: stopJob" + jobname +
                "on" + node.getNodeName( ) + "failed, state" + state);
        }
        return false;
    }
    public synchronized boolean failJob( ) {
        if ((state == IDLE) || (state == STOPPED)) {
            System.out.println("JobEntry: failJob" + jobname + "failed");
            return false;
        }
        if (debug)
            System.out.println("JobEntry: failJob" + jobname +
                    "on" + node.getNodeName( ) +
                    "failed, state" + state);
        state = IDLE;
        node = null;
        return true;
    }
    ...
}
```

LIST 5:Node.java
Copyright 2000 Market Engine Corporation

```java
package MEC.Hydra;
import . . . ;
•••
import . . . ;
// used by Cluster.java to keep track of its nodes and the states of these nodes.
// Some of these are synchronized to ensure proper state transitions.
public class Node {
```

-continued

LIST 5:Node.java
Copyright 2000 Market Engine Corporation

```java
    public static int IDLE = 0;
    public static int RUNNING = 1;
    public static int STOPPED = 2;
...
    private Cluster cluster;
    private String name;
    private long oldID = 1;
    private long newID = 0;
    private Hashtable jobs;
    private HashSet programs;
    private int state = IDLE;
    private intjobcount = 0;
...
    // Constructors
    // Create a new cluster node assigning it the name 'name'
    // and linking it back to its parent cluster.
    public Node(String name, Cluster cluster) {
        this.name = new String(name);
        this.cluster = cluster;
        programs = new HashSet( );
        jobs = new Hashtable( );
    }
...
    // Node methods
public String getNodeName( ) {
    return name;
}
public boolean isRunning( ) {
    return (state == RUNNING);
}
// Program methods
public void addProgram(String progname) {
    System.out.println("HostAgent:addProgram" + progname);
    if (!programs.contains(progname)) {
        // Add program to our list
        programs.add(progname);
        // Start up the program
        startProgram(progname);
    }
}
public void startProgram(String progname) {
    System.out.println("HostAgent:startProgram" + progname);
}
// Job methods
public void addJob(JobEntry job) {
    if(job.addJob(this)) {
        jobs.put(job.getJobName( ), job);
        jobcount++;
        startJob(job);
        System.out.println("Node" + name +
                    ":addJob:jobcount" + jobcount);
    }
}
public void removeJob(JobEntry job) {
    if (job.isRunning( ))
        stopJob(job);
        jobcount--;
        jobs.remove(job);
        System.out.println("Node" + name +
                    ":removeJob:jobcount" + jobcount);
    }
    public void failJob(JobEntry job) {
        if(job.isRunning( ))
           job.failJob( );
        jobcount--;
        jobs.remove(job);
        System.out.println("Node" + name + ":failJob:jobcount" + jobcount);
    }
    public int countJobs( ) {
        return jobcount;
    }
...
    // Private methods
    private void startJob(JobEntry job) {
        String jobname = job.getJobName( );
        String progname = job.getProgName( );
```

-continued

LIST 5:Node.java
Copyright 2000 Market Engine Corporation

```java
        String rminame;
        tmpTimer ti = new tmpTimer(Thread.currentThread( ), 5000);
        try {
            job.startJob( );
            rminame = Parameters.RmiName(name, "Coordinator");
            HostAgentRMI ha = (HostAgentRMI) Naming.lookup(rminame);
            ha.startJob(progname, jobname);
            ti.cancel( );
            job.startedJob( );
        } catch (Exception e) {
            ti.cancel( );
        }
    }
    private void stopJob(JobEntry job) {
        String jobname = job.getjobName( );
        String progname = job.getProgName( );
        String rminame;
        tmpTimer ti = new tmpTimer(Thread.currentThread( ), 5000);
        try {
            rminame = Parameters.RmiName(name, "Coordinator");
            HostAgentRMI ha = (HostAgentRMI) Naming.lookup(rminame);
            ha.stopJob(progname, jobname);
            ti.cancel( );
            job.stoppedJob( );
        } catch (Exception e) {
            ti.cancel( );
        }
    }
    // polls the nodes (host agents) every n milliseconds. In this case, n = 5 seconds.
    // This example uses RMI to communicate.
    public void pollNode( ) {
        String rminame;
        tmpTimer ti = new tmpTimer(Thread.currentThread( ), 5000);
        //System.out.println("Node:pollNode:begin" + name);
        try {
            rminame = Parameters.RmiName(name, "HostAgent");
            HostAgentRMI ha = (HostAgentRMI) Naming.lookup(rminame);
            newID = ha.getInstanceID( );
            ti.cancel( );
            //System.out.println("Node:newID:" + newID);
            ha = null;
            state = RUNNING;
            //System.out.println("Node:pollNode:end" + name);
        } catch (Exception e) {
            ti.cancel( );
            newID = 0;
            state = STOPPED;
            //System.out.println("Node:pollNode:failed" + name);
            //System.out.println("Node:pollNode:e:" + e.getMessage( ));
        }
    }
    public void pollJobs( ) {
        for (Enumeration en = jobs.elements( ); en.hasMoreElements( );) {
            JobEntry job = (JobEntry) en.nextElement( );
            if(job.state == job.WANTRUN) {
                //stopJob(job);
                startJob(job);
            } else if(job.state == job.WANTSTOP) {
                stopJob(job);
            }
        }
    }
}
    ...
```

LIST 6: HostAgent-1.java
Copyright 2000 Market Engine Corporation

```java
package MEC.Hydra;
import . . . ;
•••
import . . . ;
// In this example, one host agent is run on each node and a node is only 'active' to the
// cluster if the host agent is in good health.
public class HostAgent extends UnicastRemoteObject implements HostAgentRMI {
    //
    // Constructors
    //
    public HostAgent( ) throws RemoteException {
        super( );      // redundant
        // Run RMI registry service internally
        reg = LocateRegistry.createRegistry(Parameters.RMI_PORT);
        jobs = new HashSet( );
        sender = new Sender("localhost", 2000);
    }
•••
    //
    // Private data
    //
    private Registry reg = null;    // Registry
    private static String Hostname;          // Local hostname
    private static String coordinatorHost;       // Coordinator's hostname
    private static long instanceID;         // Unique ID for this HostAgent
    private HashSet jobs;          // List or running jobs (symbols)
    private Sender sender;
                // Communication node for VeCN
•••
//
// Public methods
//
public static String getHostName( ) {
    String hostname;
    try {
        InetAddress addr = InetAddress.getLocalHost( );
        hostname = addr.getHostName( );
    } catch (UnknownHostException err) {
        hostname = new String("localhost");
    }
    return hostname;
}
// Return this HostAgent's unique instance identifier. This value
// is different each time the HostAgent is started and is used by
// by the Coordinator to check if the HostAgent is alive. At the
// same time, the HostAgent checks if the Coordinator has asked it
// for its ID in the past n milliseconds and restarts the
// Coordinator if it has not. So checking goes both ways.
public static long previous_call;
public long getInstanceID( ) {
    previous_call = System.currentTimeMillis( );
    return instanceID;
}
// This method is called periodically in order to restart the
// Coordinator if it is not running anymore. In the case that
// multiple instances of the Coordinator get started, they
// detect each other and all but the Coordinator with the smallest
// IP address and process id commit suicide
public void checkCoordinator( ) {
    if (System.currentTimeMillis( ) - 5000 > previous_call)
    {
        •••
        // restart coordinator because we haven't heard
        // from it in over 5 seconds!
    ............}
}
        •••
public void setCoordinatorHost(String host) {
    coordinatorHost = host;
}
public String getCoordinatorHost( ) {
    return coordinatorHost;
}
// Start a job on the local nodecontroller (VeCN) - in this example, the VECNjob is
// assured to run and starting a new job means sending a message to the VECN and
// telling it to add the processing of a new symbol. Alternatively, actual processes could
```

LIST 6: HostAgent-1.java
Copyright 2000 Market Engine Corporation

```java
// be started as illustrated in Host Agent-2.java.
public boolean startJob(String progname, String jobname) {
    String fullname = progname + "/" + jobname;
    // Confirm job is not running here
    if(!jobs.contains(fullname)) {
        // Add job to our list
        jobs.add(fullname);
        // Tell NodeContoller (VeCN) to start running job (symbol)
        sendStopMessage(jobname);
        sendStartMessage(jobname);
        System.out.println("HostAgent:started" + fullname);
    }
    return true;
}
    // Start a job on the local node controller (VeCN). In this example, the VeCN job
    // is assumed to run and starting a new job means sending a message to the VeCN,
    // signaling it to add a new symbol. Alternatively, actual processes can be
    // started, as illustrated in HostAgent-2.java.
public boolean startJob(String jobname) {
    return startJob("VECN", jobname);
}
// Stop a job (symbol) running on the local nodecontroller (VeCN)
public boolean stopJob(String progname, String jobname) {
    String fullname = progname + "/" + jobname;
    // Is job ruuning here?
    if (jobs.contains(fullname)) {
        // Remove job from our list
        jobs.remove(fullname);
        // Tell local NodeController (VeCN) to stop running job (symbol)
        sendStopMessage(jobname);
        System.out.println("HostAgent:stopping" + fullname);
    }
    return true;
}
// Stop a job (symbol) running on the local nodecontroller (VeCN)
public boolean stopJob(String jobname) {
    return stopJob("VECN",jobname);
}
// Stop all jobs running
public void stopAllJobs( ) {
    String jobname;
    // Go through list of jobs and stop each one
    for (Iterator it = jobs.iterator( ); it.hasNext( ); ) {
        jobname = (String)it.next( );
        stopJob(jobname);
    }
}
public boolean checkJob(String jobname) {
    if (jobs.contains(jobname)) {
        return true;
    } else {
        return false;
    }
}
...
//
// Private methods
//
// Send a message to local NodeController (VeCN) to start job (symbol)
private void sendStartMessage(String jobname) {
    CUSIP cusip = new CUSIP(jobname);
    ActivateSymbolMessage message = new ActivateSymbolMessage(cusip);
    if (sender.SendMessage(message, true)) {
        sender.FlushBuffers( );
    } else {
        System.out.println("HostAgent:sender failed");
    }
}
// Send a message to local NodeController (VeCN) to stop job (symbol)
private void sendStopMessage(String jobname) {
    CUSIP cusip = new CUSIP(jobname);
    DeactivateSymbolMessage message = new DeactivateSymbolMessage(cusip);
    if (sender.SendMessage(message, true)) {
        sender.FlushBuffers( );
    } else {
        System.out.println("HostAgent:sender failed");
```

LIST 6: HostAgent-1.java
Copyright 2000 Market Engine Corporation

```java
        }
    }
    ...
// This method starts up the communication infrastructure and assigns an ID to itself.
// After this, it is ready to accept jobs or other commands from the coordinator.
public static void run( ) {
        Hostname = getHostName( );
        // Create and install a security manager
        if (System.getSecurityManager( ) == null) {
           System.setSecurityManager(new RMISecurityManager( ));
        }
        Date now = new Date( );
        instanceID = now.getTime( );
        // Register with RMI
        try {
           String rminame;
           HostAgent obj = new HostAgent( );
           rminame = Parameters.RmiName(Hostname, "HostAgent");
           Naming.rebind(rminame, obj);
           System.out.println("HostAgent:bind" + rminame);
        } catch (Exception err) {
           System.out.println("HostAgent err:" + err.getMessage( ));
           err.printStackTrace( );
        }
    }
    ...
    // Main - usually called when a node is started up (see shell script).
    public static void main(String args[ ]) {
        run( );
    }
}
```

LIST 7: HostAgent-2.java
Copyright 2000 Market Engine Corporation

```
1    package MEC.Hydra;
2    import . . .;
3    ...
4    import . . .;
5    // This is a second version of the HostAgent that can easily be used in conjuction with
6    // the first version to get an extended implementation.
7    /**---------------------------------------------------------------------
8     * JOB THREAD CLASS --
9     *
10    * This class is used to fork threads for jobs that the HostAgent
11    * needs to keep track of.
12    * Given the name of the java program to be called, it will invoke
13    * the main program for that class.
14    *----------------------------------------------------------------*/
15   class JobThread implements Runnable {
16       private int MAXARGS = 256;
17       private String prog;
18       private String [ ] args;
19       private int numArgs;
20       ...
21       public JobThread(String cmd) {
22           args = new String[MAXARGS];
23           parseCommand(cmd);
24       }
25       ...
26       /** parseCommand -
27        * code to parse the program and arguments from
28        * the command string. This could also be done with built-in functions.
29        */
30       public void parseCommand(String cmd) {
31           int space1 = 0;
32           int space2 = 0;
33           space2 = cmd.indexOf(" ", space1);
34           if(space2 == -1) {
35               space2 = cmd.length( );
36           }
```

-continued

LIST 7: HostAgent-2.java
Copyright 2000 Market Engine Corporation

```
37          prog = cmd.substring(space1, space2);
38          numArgs = 0;
39          while(space2 < cmd.length ()) {
40              space1 = space2 + 1;
41              space2 = cmd.indexOf(" ", space1);
42              if(space2 == -1) {
43                  space2 = cmd.length( );
44              }
45              args[numArgs] = cmd.substring(space1, space2);
46              numArgs++;
47              if(numArgs >= MAXARGS) {
48                  System.err.println("Not enough space in args struct");
49                  return;
50              }
51          }
52  //          System.err.println("parseCommand: prog is" + prog + ".numArgs is" +
53 numArgs);
54  //          for(int i = 0; i < numArgs; i++) {
55  //              System.err.println("arg" + i + "is" + args[i]);
56  //          }
57      }
58      /** run --
59       * call the job Thread class's main with specified command-line
60       * arguments.
61       */
62      public void run( ) {
63  //          System.out.println("Starting job thread");
64          Class paramTypes [ ] = {(new String[0]).getClass( )};
65          try {
66              Class which = Class.forName(prog);
67                  Object obj = which.newInstance( );
68                  java.lang.reflect.Method method = which.getMethod("main", paramTypes);
69                  Object[ ] invokeArgs = new Object[1];
70                  invokeArgs[0] = args;
71                  method.invoke(obj, invokeArgs);
72          }
73          catch(Exception err) {
74              System.err.println(err.getMessage( ));
75              err.printStackTrace( );
76          }
77      }
78      ...
79  }
80  /*----------------------------------------------------------------
81   * CHECK STATUS DAEMON CLASS
82   *----------------------------------------------------------------*/
83  class CheckStatusThread implements Runnable {
84      private HostAgent agent;
85      CheckStatusThread(HostAgent ha) {
86          agent = ha;
87      }
88      public void run( ) {
89          System.out.println("Starting check status thread");
90  //          HostAgent.checkThreads(agent);
91          HostAgent.checkProcs(agent);
92      }
93  }
94  /*----------------------------------------------------------------
95   * HOST AGENT CLASS
96   *
97   * The host agent class will keep alive all jobs that it starts.
98   * Started jobs are assumed to want to run forever -- there is no
99   * "normal" exit state, so all started jobs are kept alive until
100  * killJob is called in this version.
101  *----------------------------------------------------------------*/
102 class HostAgent extends UnicastRemoteObject implements HostAgent_Interface {
103     private Runtime runtime;
104     private String HostName;
105     private String ProcessID;
106     private final int MAX_WAIT_SECONDS = 60;
107     private final String COORD_PROGRAM = "/bin/coordinator";
108     // private Coordinator coordinator;
109     private Process CoordProcess; // only set if Coordinator runs locally
110     private Process FrontEndProcess; // only set if FrontEnd runs locally
111     ...
112     /** HostAgent constructor --
```

-continued

LIST 7: HostAgent-2.java
Copyright 2000 Market Engine Corporation

```
113         * Called during system boot process or by Coordinator after HostAgent
114         * crash.
115         */
116         public HostAgent(String hostname) throws java.rmi.RemoteException {
117                 super( );
118                 ProcessID = new String("processID"); // XXX get process id
119                 runtime = Runtime.getRuntime( );
120                 HostName = hostname;
121                 //              if(findCoordinator( ) == false) {
122                 //startCoordinator( );
123                 //              }
124         }
125         /** pingHostAgent --
126         * essentially a ping for the HostAgent process.
127         */
128         public boolean pingHostAgent( ) throws java.rmi.RemoteException {
129                 returntrue;
130         }
131         •••
132         private void startProcess(String jobName, String cmd) {
133                 Process proc;
134                 try {
135                 //      System.out.println("startProcess: starting" + cmd);
136                 proc = runtime.exec(cmd);
137                 //      System.out.println("startProcess: reading output");
138                 //      byte[ ] data = new byte[256];
139                 //      proc.getInputStream( ).read(data);
140                 //      System.out.write(data);
141                 JobList.addJob(jobName, cmd, proc);
142                 }
143                 catch(java.io.IOException err) {
144                         System.err.println("HostAgent.startJob exec failed");
145                         System.err.println(err.getMessage( ));
146                 }
147         }
148         private void startThread(String jobName, String cmd) {
149                 Thread t = new Thread(new JobThread(cmd));
150                 t.start( );
151                 JobList.addJob(jobName, cmd, t);
152         }
153         •••
154         public void startJob(String jobName, String cmd) {
155                 startProcess(jobName, cmd);
156                 //      startThread(jobName, cmd);
157         }
158
159     public void killJob(String jobName) throws java.rmi.RemoteException {
160         try{
161             Object obj = JobList.removeJob(jobName);
162             if(obj.getClass( ) == Thread.class) {
163                 Thread t = (Thread) obj;
164                 t.destroy( );
165                 if(t.isAlive( )) {
166                     HaraKiri( );
167                 }
168             }
169             if(obj.getClass( ) == Process.class) {
170                 Process proc = (Process) obj;
171                 proc.destroy( );
172                 try {
173                     proc.exitValue( );
174                 }
175                 catch(IllegalThreadStateException err) {
176                     HaraKiri( );
177                 }
178             }
179         }
180         catch(NoSuchJob err) {
181             // Don't need to do anything here.
182         }
183     }
184     // Used to convert potential falures into full failures and to commit suicide when
185     // multiple instances are started. This is usually done in instances of the
186     // coordination of higher level matters.
187     public void HaraKiri( ) {
188         System.out.println("HostAgent commiting Hara Kiri");
```

LIST 7: HostAgent-2.java
Copyright 2000 Market Engine Corporation

```
189         System.exit(1);
190       }
191    /*----------------------------------------------------------*/
192    static void checkThreads(HostAgent agent) {
193       int sleepTime = 1000; // in milliseconds
194       JobListReport [ ] joblist;
195       Thread t;
196       boolean alive;
197       while(true) {
198          try {
199             Thread.sleep(sleepTime);
200          }
201          catch(java.lang.InterruptedException exp) {
202             System.err.println("Thread interrupted");
203          }
204          joblist = JobList.getJobList( );
205          for(int i=0; i < joblist.length; i++) {
206             t = (Thread) joblist[i].object;
207             alive = t.isAlive( );
208             // System.out.println("Job" + joblist[i].jobName + "isAlive:" + alive);
209
210             if(alive == false) {
211                try {
212                   System.out.println("Restarting" + joblist[i].jobName);
213                   Object obj = JobList.removeJob(joblist[i].jobName);
214                   agent.startJob(joblist[i].jobName, joblist[i].command);
215                }
216                catch(NoSuchJob err) {
217                   // if we get here, the job has been removed between
218                   // the getJobList and removeJob. Since it should
219                   // only be removed here or by specifically calling
220                   // killJob, a killJob must have been called, so
221                   // we don't want to restart this job.
222                }
223             }
224          }
225          ...
226       }
227    }
228    static void checkProcs(HostAgent agent) {
229       int sleepTime = 1000; // in milliseconds
230       JobListReport [ ] joblist;
231       Process proc;
232       boolean alive;
233       while(true) {
234          try {
235             Thread.sleep(sleepTime);
236          }
237          catch(java.lang.InterruptedException exp) {
238             System.err.println("Thread interrupted");
239          }
240          joblist = JobList.getJobList( );
241          for(int i=0; i < joblist.length; i++) {
242             proc = (Process) joblist[i].object;
243             alive = false;
244             try {
245                proc.exitValue( );
246             }
247             catch(IllegalThreadStateException err) {
248                alive = true;
249             }
250             // System.out.println("Job" + joblist[i].jobName + "isAlive:" + alive);
251             if(alive) {
252                try {
253                   byte[ ] data = new byte[256];
254                   proc.getInputStream( ).read(data);
255                   System.out.write(data);
256                }
257                catch(IOException err) {
258                   System.err.println("IO Error");
259                   System.err.println(err.getMessage( ));
260                }
261             }
262
263             else {
264                try {
```

-continued

LIST 7: HostAgent-2.java
Copyright 2000 Market Engine Corporation

```
265                 System.out.println("Restarting" + joblist[i].jobName);
266                 Object obj = JobList.removeJob(joblist[i].jobName);
267                 agent.startJob(joblist[i].jobName, joblist[i].command);
268             }
269             catch(NoSuchJob err) {
270                 // if we get here, the job has been removed between
271                 // the getJobList and removeJob. Since it should
272                 // only be removed here or by specifically calling
273                 // killJob, a killJob must have been called, so
274                 // we don't want to restart this job.
275             }
276         }
277     }
278     ...
279   }
280 }
281 // Additional methods not used during demonstration mode are commented out here.
282 /** checkStatus --
283  * Periodically called to check:
284  * 1) whether a Coordinator is running locally
285  * 2) whether a FrontEnd is running locally
286  * 3) status for each process in joblist
287  * 4) overall system load
288  * Currently system load is represented by the number of jobs.
289  */
290 // private HostAgentReport checkThreadStatus( ) {
291 //         HostAgentReport report = new HostAgentReport(joblist.length);
292 //         SetjobNameSet = joblist.keySet( );
293 //         Iterator i = jobNameSet.iterator( );
294 //         int count;
295 //         Process proc;
296 //         Thread t;
297 //             report.jobNames = new String [joblist.length];
298 //         for(count = 0; count < joblist.length; count++) {
299 //             report.jobNames[i] = i.next( );
300 //             proc = report.jobNames[i].getProcess( );
301 //         }
302 //         // do not restart if problem, just set values to null
303 //         report.localCoordinator = (CoordProcess != null);
304 //         report.localFrontEnd = (FrontEndProcess != null);
305 //         report.systemLoad.jobqueue = joblist.length;
306 //         return report;
307         }
308 //     /** getHostList --
309 //      */
310 //     private String [ ] getHostList( ) {
311 //         String allHostNames = {"cbo", "nyse", "nasdaq", "pse"};
312 //         return allHostNames;
313 //     }
314 //     /** findCoordinator --
315 //      * Query all known hosts for Coordinator process.
316 //      */
317 //     private boolean findCoordinator( ) {
318 //         String allHosts [ ] = makeAllHostList( );
319 //         Remote robj;
320 //         boolean foundCoordinator = false;
321 //         for(int i = 0; i < allHosts.length; i++) {
322 //             if(foundCoordinator == false) {
323 //                 try {
324 //                     robj = Naming.lookup("//" + allHosts[i] + "/Coordi-
325 nator");
326 //                     coordinator = (Coordinator) robj;
327 //                     foundCoordinator = coordinator.getCoordinator( );
328 //                 }
329 //             }
330 //         }
331 //         return foundCoordinator;
332 //     }
333     /** startCoordinator --
334      * 1) Wait in case another host is starting a coordinator.
335      * 2) Check again for Coordinator.
336      * 3) If none exists, start one on local host.
337      */
338 //     private void startCoordinator( ) {
339 //         InetAddress InetAddr = InetAddress.getByName("localhost");
340 //         int rand = (InetAddr + ProcessID) % MAX_WAIT_SECONDS;
```

-continued

LIST 7: HostAgent-2.java
Copyright 2000 Market Engine Corporation

```
341     //              Thread t = Thread.currentThread( );
342     //              try(
343     //                  t.sleep(rand);
344     //              }
345     //              catch(InterrupedException ie) {
346     //              }
347     //              if(findCoordinator( )) {
348     //                  return;
349     //              }
350     //              else {
351     //                  try {
352     //                      coordProcess = runtime.exec(COORD_PROGRAM);
353     //                  }
354     //              }
355     //          }
356     //      }
357     //      /** jobExit --
358     //       * Called by exiting processes started by this HostAgent.
359     //       * Remove job from joblist.
360     //       */
361     //      public void jobExit(StringjobName) {
362     //          Process proc = joblist.getProcess(jobName);
363     //          joblist.removeJob(jobName);
364     //      }
365     //      public void reportStatus( ) {
366     //          HostAgentReport report = checkStatus( );
367     //          try {
368     //              coordinator.reportStatus(report);
369     //          }
370     //          catch(RemoteException err) {
371     //              startCoordinator( );
372     //          }
373     //      }
374     •••
375     // In this example code, some jobs are started and kept alive, even over 'kill-9' com-
376 mands.
377     public static void main (String[ ] args) {
378         HostAgent hostAgent;
379         String hostname = null;
380         String port = null;
381         if(args.length != 2) {
382             System.err.println("usage: hostname port");
383             return;
384         }
385         hostname = args[0];
386         port = args[1];
387         System.setSecurityManager(new RMISecurityManager( ));
388         try {
389             hostAgent = new HostAgent(hostname);
390             Naming.rebind ("//" + hostname + ":" + port + "/HostAgent", hostAgent);
391         }
392         catch(Exception e) {
393             System.err.println("Failed to register HostAgent");
394             System.out.println(e.getMessage( ));
395             e.printStackTrace( );
396             return;
397         }
398         System.out.println("HostAgent started on" + hostAgent.HostName);
399         // start checkStatus daemon
400         Thread t = new Thread(new CheckStatusThread(hostAgent));
401         t.start( );
402         hostAgent.startJob("vecn", "/bin/java -Xms 100m -Xmx200m
403 MEC.NodeController.NodeController IBM INKT MSFT YHOO QCOM WCOM INTC DELL
404 ORCL AMZN CSCO GSTRF");
405         //      hostAgent.startJob("demoA", "/bin/java DemoAppA");
406         //      hostAgent.startJob("demoB", "/bin/java DemoAppB");
407         //      hostAgent.startJob("demoA", "DemoAppA");
408         //      hostAgent.startJob("demoB", "DemoAppB");
409     }
410 }
```

While the invention has been particularly shown and described with reference to one embodiments thereof it will be understood by those skilled in the art that various changes in form and details may be made therein without departing from the scope of the invention.

What is claimed is:

1. A fault tolerant computer system for executing one or more jobs on one or more nodes, comprising,
 a hierarchy of monitors for monitoring operations in the computer system including,
  one or more first monitors for monitoring first operations and, for any particular one of said first operations that fails, for restarting another instance of said particular one of said first operations,
  one or more second monitors for monitoring said first monitors and, if any particular one of said first monitors fails, for restarting another instance of said particular one of said first monitors.

2. The system of claim 1 wherein,
 said one or more of said second monitors are monitored by at least one of said first monitors and, if any particular one of said second monitors fails, said at least, one of said first monitors restarts another instance of said particular one of said second monitors.

3. The system of claim 2 wherein one or more of said second monitors operates to commit suicide if more than one of said another instance of said particular one of said second monitors is restarted.

4. The system of claim 1 wherein,
 said nodes operate to execute processes in a service unit, a communication unit and a resource management unit.

5. The system of claim 1 wherein each of said nodes includes a computer having an operating system, wherein pluralities of nodes form clusters and wherein each cluster has a corresponding instantiation of said hierarchy of monitors for monitoring operations in the computer system.

6. The system of claim 5 wherein each instantiation of said hierarchy of monitors includes,
 a first instantiation of said one or more first monitors for monitoring first instantiation operations and, for any particular one of said first instantiation operations that fails, for restarting another instance of said particular one of said first instantiation operations,
 a second instantiation of said one or more second monitors for monitoring said first monitors of said first instantiation and, if any particular one of said first monitors of said first instantiation fails, for restarting another instance of said particular one of said first monitors of said first instantiation.

7. The system of claim 5 including first and second instantiations and wherein,
 said one or more of said second monitors of said second instantiation are monitored by at least one of said first monitors of said first instantiation and, if any particular one of said one or more of said second monitors of said second instantiation fails, for restarting another instance of said particular one of said one or more of said second monitors of said second instantiation.

8. The system of claim 1 wherein,
 said second monitors maintain a record of particular ones of the first monitors that are active and corresponding active particular ones of said first operations being monitored by said particular ones of the first monitors.

9. The system of claim 8 wherein,
 said second monitors use said record to ensure that active particular ones of said first operations monitored by a failing one of said particular ones of the first monitors that are active is monitored by a new instance of said failing one of said particular ones of the first monitors that are active.

10. The system of claim 1 wherein said hierarchy of monitors includes,
 one or more additional monitors for monitoring said first monitors or said second monitors, and, if any particular one of said first monitors or said second monitors fails, restarting another instance of said particular one of said first monitors or said second monitors.

11. The system of claim 10 wherein said hierarchy of monitors includes,
 one or more other monitors for monitoring said first monitors, said second monitors or said additional monitors, and, if any particular one of said first monitors, said second monitors or said additional monitors fails, restarting another instance of said particular one of said first monitors, said second monitors or said additional monitors.

12. The system of claim 1 wherein,
 said first operations are jobs running on said nodes for providing services and, for any particular one of said jobs that fails, one of said first monitors restarts another instance of said particular one of said jobs.

13. The system of claim 12 wherein said jobs implement e-commerce transaction services.

14. The system of claim 12 wherein said jobs implement transaction services for financial instruments.

15. The system of claim 12 wherein said first monitors are host agents for monitoring operations of a plurality of jobs on a plurality of nodes where each job is monitored by only one of said host agents.

16. The system of claim 12 wherein said first monitors are one or more agents operating on a first level, each of said agents for monitoring operations of jobs on nodes where each job is monitored by only one of said agents.

17. The system of claim 12 wherein,
 said first monitors are one or more agents operating on a first level, each of said agents for monitoring operations of jobs on nodes where each job is monitored by only one of said agents, and
 said one or more second monitors includes one or more local coordinators operating on a second level where each local coordinator monitors one or more of said agents.

18. The system of claim 12 wherein,
 said first monitors are one or more agents operating on a first level, each of said agents for monitoring operations of jobs on nodes where each job is monitored by only one of said agents, and wherein a particular one of said agents runs on a particular one of said nodes where a job monitored by said particular one of said agents runs.

19. The system of claim 12 wherein,
 said first monitors are one or more agents operating on a first level, each of said agents for monitoring operations of jobs on nodes where each job is monitored by only one of said agents, and wherein a particular one of said agents runs on a particular one of said nodes where a job monitored by said particular one of said agents runs on other of said nodes than said particular one of said nodes.

20. The system of claim 12 wherein,
 said first monitors are one or more agents operating on a first level, each of said agents for monitoring operations of jobs on nodes where each job is monitored by only one of said agents, and wherein a particular one of said agents runs on a particular one of said nodes where a job monitored by said particular one of said agents runs, said second monitors are one or more local coordinators operating on a second level, each of said local coordinators for monitoring operations of agents, and wherein a particular one of said local coordinators runs on a particular one of said nodes where an agent monitored by said particular one of said local coordinators runs.

21. The system of claim 12 wherein, said first monitors are one or more agents operating on a first level, each of said agents for monitoring operations of jobs on nodes where each job is monitored by only one of said agents, and wherein a particular one of said agents runs on a particular one of said nodes where a job monitored by said particular one of said agents runs, said second monitors are one or more local coordinators operating on a second level, each of said local coordinators for monitoring operations of agents, and wherein a particular one of said local coordinators runs on a particular one of said nodes other than where an agent monitored by said particular one of said local coordinators runs.

22. The system of claim 12 wherein, said first monitors are one or more agents operating on a first level, each of said agents for monitoring operations of jobs on nodes where each job is monitored by only one of said agents, said second monitors are one or more local coordinators operating on a second level, each of said local coordinators for monitoring operations of agents, and wherein said hierarchy of monitors includes, one or more third monitors for monitoring said one or more second monitors and, for any particular one of said second monitors that fails, restarting another instance of said particular one of said second monitors, and wherein a particular one of said third monitors that monitors said particular one of said second monitors runs on a different node than a node where said particular one of said second monitors runs.

23. The system of claim 22 wherein said hierarchy of monitors includes, one or more fourth monitors for monitoring said one or more third monitors and, for any particular one of said third monitors that fails, restarting another instance of said particular one of said third monitors, and wherein a particular one of said fourth monitors that monitors said particular one of said third monitors runs on a different node than a node where said particular one of said third monitors runs.

24. The system of claim 12 wherein, said first monitors are one or more agents operating on a first level, each of said agents for monitoring operations of jobs on nodes where each job is monitored by only one of said agents, said second monitors are one or more local coordinators operating on a second level, each of said local coordinators for monitoring operations of agents, and wherein said hierarchy of monitors includes, one or more third monitors for monitoring said one or more second monitors and, for any particular one of said second monitors that fails, restarting another instance of said particular one of said second monitors, and wherein a particular one of said third monitors that monitors said particular one of said second monitors runs on a node where said particular one of said second monitors runs.

25. The system of claim 24 wherein said hierarchy of monitors includes, one or more fourth monitors for monitoring said one or more third monitors and, for any particular one of said third monitors that fails, restarting another instance of said particular one of said third monitors, and wherein a particular one of said fourth monitors that monitors said particular one of said third monitors runs on a node where said particular one of said third monitors runs.

26. The system of claim 1 wherein said hierarchy of monitors includes, one or more third monitors for monitoring said one or more second monitors and, for any particular one of said second monitors that fails, restarting another instance of said particular one of said second monitors.

27. The system of claim 26 wherein one or more of said second monitors operates to commit suicide if more than one of said instance of said particular one of said second monitors is restarted.

28. The system of claim 26 wherein said one or more third monitors run on different ones of said nodes than ones of said nodes on which said second monitors run.

29. The system of claim 26 wherein said hierarchy of monitors includes, one or more fourth monitors for monitoring said one or more third monitors and, for any particular one of said third monitors that fails, restarting another instance of said particular one of said third monitors.

30. The system of claim 29 wherein said one or more fourth monitors run on different ones of said nodes than ones of said nodes on which said third monitors run.

31. The system of claim 29 wherein said one or more fourth monitors run on ones of said nodes which are the same as ones of said nodes on which said third monitors run.

32. The system of claim 29 wherein one or more of said third monitors operates to commit suicide if more than one of said instance of said particular one of said third monitors is restarted.

33. The system of claim 1 having a resource management unit including a load-balancing for distributing jobs among said nodes.

34. The system of claim 1 having a resource management unit including a persistent storage unit.

35. The system of claim 1 having a resource management unit including an interface unit.

36. The system of claim 1 wherein, each of said nodes includes a plurality of computers each having an operating system.

37. The system of claim 1 having a plurality of clusters of said nodes, each cluster having a corresponding instantiation of said hierarchy of monitors for monitoring operations in the computer system.

38. The system of claim 37 wherein, each of said clusters of nodes operates to execute processes organized into a service unit, a communication unit and a resource management unit.

39. The system of claim 37 wherein, said clusters of nodes are organized into groups, each group having one or more of said clusters.

40. The system of claim 39 wherein, a first one of said groups is located at a geographic location remote from a second one of said groups and said first one of said groups is connected to said second one of said groups by one or more networks.

41. The system of claim 39 wherein,
a first one of said groups is organized to execute on one subset of data and a second one of said groups is organized to execute on another subset of data.

42. The system of claim 37 wherein,
a first one of said groups is organized to execute on one subset of data and a second one of said groups is organized to provide backup for said one subset of data.

43. The system of claim 1 wherein,
said first operations are jobs running on said nodes for providing services,
said first monitor senses one or more conditions that can cause any particular one of said jobs to fail whether or not said particular one of said jobs has actually failed,
one of said first monitors terminates said particular one of said jobs and restarts another instance of said particular one of said jobs.

44. The system of claim 43 wherein,
said one of said first monitors that terminates said particular one of said jobs restarts said another instance of said particular one of said jobs in an environment where said one or more conditions are not present.

45. The system of claim 43 wherein,
said one of said conditions is a node failure and said another instance of said particular one of said jobs is started on a different non-failing node.

46. The system of claim 43 wherein,
said one of said conditions is a job failure and said another instance of said particular one of said jobs is started as a new instance of said job.

47. The system of claim 46 wherein,
said another instance of said particular one of said jobs is started as a new instance of said job on a node the same as a node on which said particular one of said jobs was running.

48. The system of claim 46 wherein,
said another instance of said particular one of said jobs is started as a new instance of said job on a new node different from a node on which said particular one of said jobs was running.

49. The system of claim 1 wherein each of said nodes includes a computer and wherein new ones of said nodes are added to the system without disturbing the operations of other of said nodes in the computer system and wherein jobs are assigned dynamically to said new ones of said nodes.

50. The system of claim 1 wherein each of said nodes includes a computer and wherein ones of said nodes are removed from the system without disturbing the operations of other of said nodes in the computer system and wherein particular jobs are reassigned dynamically to other of said nodes in the computer system.

51. The system of claim 1 wherein each of said nodes includes a computer of one type and wherein new ones of said nodes are added to the system including upgraded computers of a different type without disturbing the operations of other of said nodes in the computer system and wherein jobs are assigned dynamically from said other of said nodes to said new ones of said nodes to provide dynamic upgrade of said system without stopping said particular jobs.

52. The system of claim 1 wherein pluralities of nodes form clusters and wherein particular ones of said clusters are assigned for processing particular jobs at particulars times and wherein other ones of said clusters are assigned for processing said particular jobs at other times.

53. The system of claim 52 wherein said particular times and said other times are follow-the-sun times.

54. The system of claim 1 wherein a delay time is controlled before the restart of a job.

55. The system of claim 1 having an interface that allows humans to monitor the health of the system and to log statistics about uptime of each component in the system.

56. The system of claim 1 wherein a delay time is applied before said restarting another instance of said particular one of said first operations.

57. The system of claim 1 wherein in said hierarchy of monitors,
said one or more of said second monitors are monitored by at least one of said first monitors and, if any particular one of said second monitors fails, said at least one of said first monitors, after a first delay time, restarts another instance of said particular one of said second monitors on a node other than a node on which said particular one of said second monitors failed.

58. The system of claim 57 wherein,
if more than one instance of said another instance of said particular one of said second monitors is restarted, all but one instance of said another instance of said particular one of said second monitors commits suicide.

59. The system of claim 57 wherein said hierarchy of monitors includes,
one or more additional monitors for monitoring said first monitors and said second monitors, and, if any particular one of said first monitors or said second monitors fails, restarting, after a second delay time, another instance of said particular one of said first monitors or said second monitors.

60. The system of claim 59 wherein,
if more than one of instance of said another instance of said particular one of said first monitors or said second monitors is restarted, all but one instance of said another instance of said particular one of said first monitors or said second monitors operates to commit suicide.

61. The system of claim 59 wherein said hierarchy of monitors includes,
one or more other monitors for monitoring said first monitors, said second monitors and said additional monitors, and, if any particular one of said first monitors, said second monitors or said additional monitors fails, restarting, after a third delay time, another instance of said particular one of said first monitors, said second monitors or said additional monitors.

62. The system of claim 61 wherein,
if more than one instance of said another instance of said particular one of said first monitors, said second monitors or said additional monitors is restarted, all but one instance of said another instance of said particular one of said first monitors, said second monitors or said additional monitors operates to commit suicide.

63. The system of claim 1 wherein,
said first operations are jobs running on said nodes for providing services where a particular first one of said jobs associated with a first customer is running on a particular first node and a particular second one of said jobs associated with a second customer is running on said particular first node.

64. The system of claim 1 wherein,
said first operations are jobs running on said nodes for providing services where a particular first one of said jobs associated with a first customer is running on a particular first node and a particular second one of said jobs associated with a second customer is running on a particular second node whereby said first customer job is isolated from said second customer job.

65. The system of claim 1 wherein,
    said first operations are jobs running on said nodes for providing services where,
    particular first ones of said jobs are associated with a first customer with one of said particular first ones of said jobs running on a particular first node and with another one of said particular first ones of said jobs running on a particular other node;
    particular second ones of said jobs are associated with a second customer with one of said particular second ones of said jobs running on a particular second node and with another one of said particular second ones of said jobs running on said particular other node.

66. The system of claim 1 including transaction initiators for starting said first operations as one or more jobs to initiate a transaction in a service.

67. The system of claim 1 including transaction processors for starting said first operations as one or more jobs to process a transaction in a service.

68. The system of claim 1 including,
    transaction initiators for starting first ones or more of said first operations as one or more first jobs on a first node to initiate a transaction in a service;
    transaction processors for starting other ones or more of said first operations as one or more other jobs on another node to process said transaction in said service.

69. The system of claim 1 including,
    transaction initiators for starting first ones or more of said first operations as one or more first jobs on a first node to initiate a transaction in a service;
    transaction processors for starting other ones or more of said first operations as one or more other jobs on said first node to process said transaction in said service.

70. In a fault tolerant computer system operating to execute one or more jobs on one or more nodes where the computer system includes a hierarchy of monitors for monitoring operations in the computer system, the method comprising,
    monitoring first operations with one or more first monitors and, for any particular one of said first operations that fails, restarting another instance of said particular one of said first operations,
    monitoring said first monitors with one or more second monitors and, if any particular one of said first monitors fails, restarting another instance of said particular one of said first monitors.

71. The method of claim 70 wherein,
    monitoring said one or more of said second monitors with at least one of said first monitors and, if any particular one of said second monitors fails, restarting with said at least one of said first monitors another instance of said particular one of said second monitors.

72. The method of claim 71 wherein one or more of said second monitors operates to commit suicide if more than one of said another instance of said particular one of said second monitors is restarted.

* * * * *